(12) United States Patent
Song et al.

(10) Patent No.: US 11,749,952 B2
(45) Date of Patent: *Sep. 5, 2023

(54) ELECTRIC CONNECTOR AND ELECTRIC CONNECTOR ASSEMBLY

(71) Applicant: DONGGUAN LUXSHARE TECHNOLOGIES CO., LTD, Dongguan (CN)

(72) Inventors: Tao Song, Dongguan (CN); Kun Liu, Dongguan (CN); Kaide Wang, Dongguan (CN); Jinchuang Lan, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 178 days.

This patent is subject to a terminal disclaimer.

(21) Appl. No.: 17/342,025

(22) Filed: Jun. 8, 2021

(65) Prior Publication Data
US 2021/0399480 A1 Dec. 23, 2021

(30) Foreign Application Priority Data

Jun. 19, 2020 (CN) .......................... 202010567796.4
Dec. 9, 2020 (CN) .......................... 202011433181.9
Apr. 9, 2021 (CN) .......................... 202110381399.2

(51) Int. Cl.
*H01R 4/66* (2006.01)
*H01R 13/6591* (2011.01)
(Continued)

(52) U.S. Cl.
CPC ..... *H01R 13/65912* (2020.08); *H01R 13/514* (2013.01); *H01R 13/518* (2013.01);
(Continued)

(58) Field of Classification Search
CPC .. H01R 13/514; H01R 13/518; H01R 13/631; H01R 13/65912; H01R 13/6471;
(Continued)

(56) References Cited

U.S. PATENT DOCUMENTS 4,601,527 A 7/1986 Lemke
5,664,968 A 9/1997 Mickievicz
(Continued)

FOREIGN PATENT DOCUMENTS

CN 1244959 A 2/2000
CN 2513252 Y 9/2002
(Continued)

*Primary Examiner* — Khiem M Nguyen
(74) *Attorney, Agent, or Firm* — Birch, Stewart, Kolasch & Birch, LLP

(57) ABSTRACT

An electrical connector includes a housing and a number of mating modules assembled to the housing. The mating module includes conductive terminals, metal shield surrounding members and cables. The conductive terminal includes a tail portion and a mating portion. The conductive terminal extends along a mating direction. The metal shield surrounding member includes a sleeve portion surrounding a periphery of the mating portion. The cable includes a core electrically connected to the tail portion. Compared with the prior art, the electrical connector disclosed in the present disclosure is a cable electrical connector. Besides, the conductive terminal extends along the mating direction, thereby simplifying the structural design of the conductive terminal. The present disclosure also discloses an electrical connector assembly having the electrical connector.

13 Claims, 32 Drawing Sheets

(51) Int. Cl.
*H01R 13/514* (2006.01)
*H01R 13/6586* (2011.01)
*H01R 13/518* (2006.01)
*H01R 13/6471* (2011.01)
*H01R 13/6583* (2011.01)
*H01R 13/6585* (2011.01)
*H01R 13/631* (2006.01)

(52) U.S. Cl.
CPC ....... *H01R 13/631* (2013.01); *H01R 13/6471* (2013.01); *H01R 13/6583* (2013.01); *H01R 13/6585* (2013.01); *H01R 13/6586* (2013.01); *H01R 13/6591* (2013.01)

(58) Field of Classification Search
CPC ............ H01R 13/6583; H01R 13/6585; H01R 13/6586; H01R 13/6591
USPC .......................................................... 439/108
See application file for complete search history.

(56) References Cited

U.S. PATENT DOCUMENTS

| | | | |
|---|---|---|---|
| 9,350,126 | B2 | 5/2016 | Little et al. |
| 9,548,570 | B2 | 1/2017 | Laurx et al. |
| 2004/0043658 | A1 | 3/2004 | Ko |
| 2004/0229510 | A1 | 11/2004 | Lloyd et al. |
| 2007/0155239 | A1 | 7/2007 | Nakada |
| 2008/0014798 | A1 | 1/2008 | Pan |
| 2013/0203273 | A1 | 8/2013 | Rathburn |
| 2014/0051295 | A1 | 2/2014 | Westman et al. |
| 2014/0248796 | A1 | 9/2014 | Pan |
| 2014/0295705 | A1 | 10/2014 | Lee et al. |
| 2015/0194771 | A1 | 7/2015 | Pan |
| 2015/0303618 | A1 | 10/2015 | Lee et al. |
| 2015/0318642 | A1 | 11/2015 | Lee et al. |
| 2016/0093985 | A1 | 3/2016 | Zhang et al. |
| 2016/0322760 | A1 | 11/2016 | Long et al. |
| 2018/0166828 | A1 | 6/2018 | Gailus |
| 2019/0044284 | A1 | 2/2019 | Dunham |
| 2021/0399480 | A1* | 12/2021 | Song ................. H01R 13/6583 |
| 2021/0399493 | A1* | 12/2021 | Song ................. H01R 13/6587 |

FOREIGN PATENT DOCUMENTS

| | | | |
|---|---|---|---|
| CN | 2571026 Y | 9/2003 |
| CN | 1491465 A | 4/2004 |
| CN | 1592990 A | 3/2005 |
| CN | 2682605 Y | 3/2005 |
| CN | 101159354 A | 4/2008 |
| CN | 201142392 Y | 10/2008 |
| CN | 101330172 A | 12/2008 |
| CN | 101527409 A | 9/2009 |
| CN | 101542640 A | 9/2009 |
| CN | 101728667 A | 6/2010 |
| CN | 101459299 B | 11/2010 |
| CN | 102088148 A | 6/2011 |
| CN | 102290653 A | 12/2011 |
| CN | 102468562 A | 5/2012 |
| CN | 202395246 U | 8/2012 |
| CN | 102694308 A | 9/2012 |
| CN | 102969621 A | 3/2013 |
| CN | 103151650 A | 6/2013 |
| CN | 103247918 A | 8/2013 |
| CN | 103296546 A | 9/2013 |
| CN | 103311746 A | 9/2013 |
| CN | 203288874 U | 11/2013 |
| CN | 203589266 U | 5/2014 |
| CN | 103928795 A | 7/2014 |
| CN | 103988371 A | 8/2014 |
| CN | 104037551 A | 9/2014 |
| CN | 104241975 A | 12/2014 |
| CN | 104396095 A | 3/2015 |
| CN | 104505678 A | 4/2015 |
| CN | 104577406 A | 4/2015 |
| CN | 204304028 U | 4/2015 |
| CN | 104779487 A | 7/2015 |
| CN | 104810657 A | 7/2015 |
| CN | 105024230 A | 11/2015 |
| CN | 105470679 A | 4/2016 |
| CN | 105470732 A | 4/2016 |
| CN | 105470736 A | 4/2016 |
| CN | 105612664 A | 5/2016 |
| CN | 105703159 A | 6/2016 |
| CN | 105742854 A | 7/2016 |
| CN | 105958245 A | 9/2016 |
| CN | 106207569 A | 12/2016 |
| CN | 205846279 U | 12/2016 |
| CN | 107104329 A | 8/2017 |
| CN | 104009303 B | 1/2018 |
| CN | 107565279 A | 1/2018 |
| CN | 207530119 U | 6/2018 |
| CN | 109390806 A | 2/2019 |
| CN | 109546384 A | 3/2019 |
| CN | 109546388 A | 3/2019 |
| CN | 109586086 A | 4/2019 |
| CN | 109599724 A | 4/2019 |
| CN | 109659726 A | 4/2019 |
| CN | 109841981 A | 6/2019 |
| CN | 109950721 A | 6/2019 |
| CN | 208955335 U | 6/2019 |
| CN | 109994892 A | 7/2019 |
| CN | 209056665 U | 7/2019 |
| CN | 110165448 A | 8/2019 |
| CN | 110247233 A | 9/2019 |
| CN | 110299649 A | 10/2019 |
| CN | 110323622 A | 10/2019 |
| CN | 110544850 A | 12/2019 |
| CN | 110600943 A | 12/2019 |
| CN | 110649407 A | 1/2020 |
| CN | 110718815 A | 1/2020 |
| CN | 110808499 A | 2/2020 |
| CN | 110838635 A | 2/2020 |
| CN | 111092342 A | 5/2020 |
| CN | 111370890 A | 7/2020 |
| CN | 111682368 A | 9/2020 |
| CN | 111682369 A | 9/2020 |
| JP | 2000-058172 A | 2/2000 |
| TW | 415133 B | 12/2000 |
| TW | 459428 B | 10/2001 |
| TW | M461166 U1 | 9/2013 |
| TW | I414111 B | 11/2013 |
| TW | I452767 B | 9/2014 |
| TW | I528659 B | 4/2016 |
| TW | I545845 B | 8/2016 |
| TW | M537321 U | 2/2017 |
| TW | 201733225 A | 9/2017 |
| TW | I600231 B | 9/2017 |
| TW | 201810825 A | 3/2018 |
| TW | I623154 B | 5/2018 |
| TW | 201834333 A | 9/2018 |
| TW | 201841440 A | 11/2018 |
| TW | I648925 B | 1/2019 |
| TW | M585436 U | 10/2019 |
| TW | 201943158 A | 11/2019 |
| TW | M591270 U | 2/2020 |
| TW | M593091 U | 4/2020 |
| TW | 202046584 A | 12/2020 |
| WO | WO 2016/168820 A1 | 10/2016 |
| WO | WO 2017/106266 A1 | 6/2017 |

* cited by examiner

ELECTRIC CONNECTOR AND ELECTRIC CONNECTOR ASSEMBLY

CROSS-REFERENCE TO RELATED APPLICATIONS

This patent application claims priority of a Chinese Patent Application No. 202010567796.4, filed on Jun. 19, 2020 and titled "BACKPLANE CONNECTOR ASSEMBLY", a Chinese Patent Application No. 202011433181.9, filed on Dec. 9, 2020 and titled "ELECTRICAL CONNECTOR ASSEMBLY", and a Chinese Patent Application No. 202110381399.2, filed on Apr. 9, 2021 and titled "ELECTRIC CONNECTOR AND ELECTRIC CONNECTOR ASSEMBLY", the entire content of which is incorporated herein by reference.

TECHNICAL FIELD

The present disclosure relates to an electrical connector and an electrical connector assembly having the electrical connector, which belongs to a technical field of connectors.

BACKGROUND

Existing electrical connector assemblies usually include a male connector and a female connector. The male connector usually includes a male housing and a plurality of male mating modules mounted to the male housing. Each male mating module includes an insulating bracket, a plurality of male conductive terminals insert-molded with the insulating bracket, and a first metal shield disposed on at least one side of the insulating bracket. The male conductive terminal usually includes a first mating portion and a first mounting portion perpendicular to the first mating portion.

The female connector usually includes a female housing and a plurality of female mating modules mounted to the female housing. Each female mating module includes an insulating bracket, a plurality of female conductive terminals insert-molded with the insulating bracket, and a second metal shield disposed on at least one side of the insulating bracket. The female conductive terminal usually includes a second mating portion and a second mounting portion perpendicular to the second mating portion.

The first mounting portions and the second mounting portions are usually mounted on a circuit board. However, as the signal transmission requirements of high-speed connectors continue to increase, there is still room for improvement in the architecture of the existing electrical connector assemblies.

SUMMARY

An object of the present disclosure is to provide an electrical connector and an electrical connector assembly with a simple terminal structure.

In order to achieve the above object, the present disclosure adopts the following technical solution: an electrical connector, comprising: a housing; and a plurality of mating modules assembled to the housing; each mating module comprising: a plurality of conductive terminals extending along a mating direction, each conductive terminal including a tail portion and a mating portion; a metal shield surrounding member comprising a plurality of hollow portions surrounding the mating portions; and a cable comprising a plurality of cores electrically connected to the tail portions.

In order to achieve the above object, the present disclosure adopts the following technical solution: an electrical connector assembly, comprising: a first electrical connector, comprising: a first housing; and a plurality of first mating modules assembled to the first housing; each first mating module comprising: a plurality of first conductive terminals extending along a mating direction, each first conductive terminal comprising a first tail portion and a first mating portion; a first metal shield; a second metal shield, the first metal shield and the second metal shield being located on opposite sides of the first conductive terminals; and a first cable, the first cable comprising a plurality of first cores electrically connected to the first tail portions; wherein the first conductive terminals comprise first differential signal terminals, a first ground terminal and a second ground terminal, wherein the first differential signal terminals are located between the first ground terminal and the second ground terminal; and wherein the first metal shield, the second metal shield, the first ground terminal and the second ground terminal jointly form a shielding space enclosing the first mating portions of the first differential signal terminals; and a second electrical connector for mating with the first electrical connector, the second electrical connector comprising: a second housing; and a plurality of second mating modules assembled to the second housing; each second mating module comprising: a plurality of second conductive terminals extending along the mating direction, each second conductive terminal including a second tail portion and a second mating portion; a metal shield surrounding member comprising a plurality of hollow portions surrounding the mating portions; and a second cable comprising a plurality of second cores electrically connected to the second tail portions.

Compared with the prior art, the electrical connector of the present disclosure is a cable electrical connector, and the shielding effect is improved by providing a metal shield surrounding member enclosing a periphery of the mating portion. Besides, the conductive terminal extends along the mating direction, thereby simplifying the structural design of the conductive terminal.

DETAILED DESCRIPTION

Figure 1:
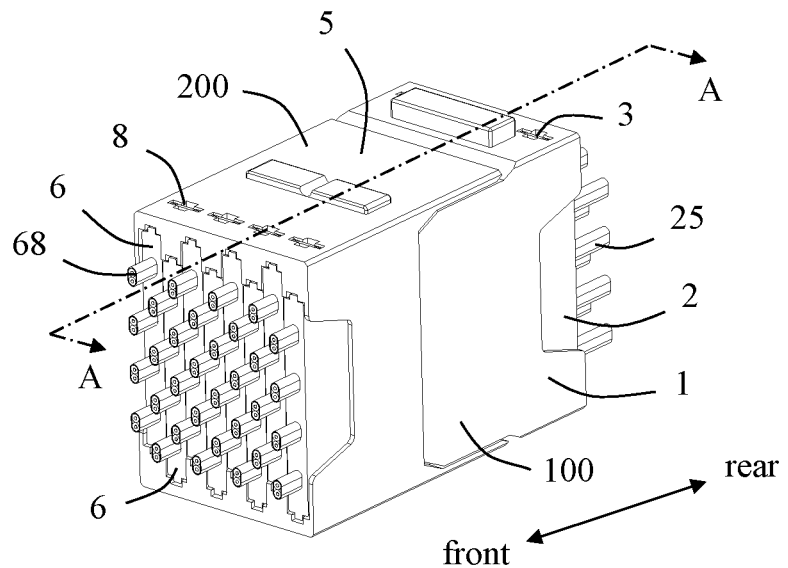
FIG. 1 is a perspective schematic view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
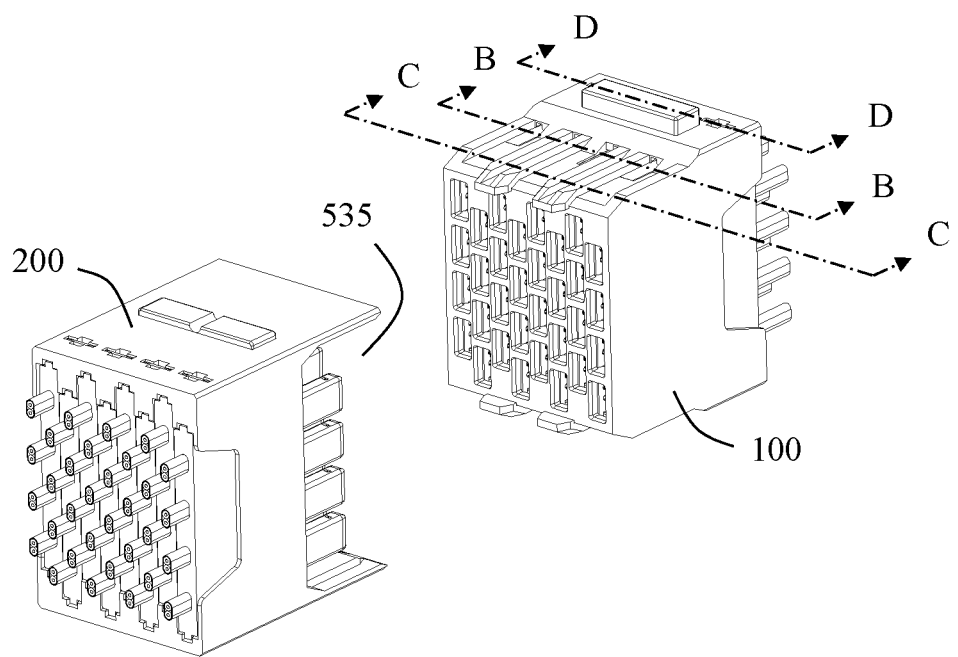
FIG. 2 is a partial perspective exploded view of FIG. 1, in which a first electrical connector and a second electrical connector are separated from each other.

Referring to FIGS. 1 and 2, an illustrated embodiment of the present disclosure discloses an electrical connector assembly including a first electrical connector 100 and a second electrical connector 200 for mating with the first electrical connector 100. The first electrical connector 100 is a first backplane connector, and the second electrical connector 200 is a second backplane connector. Specifically, in the illustrated embodiment of the present disclosure, the first backplane connector is a first backplane cable connector, and the second backplane connector is a second backplane cable connector. The first electrical connector 100 and the second electrical connector 200 are mated with each other along a mating direction for signal transmission. In the illustrated embodiment of the present disclosure, the mating direction is a front-rear direction.

Figure 3:
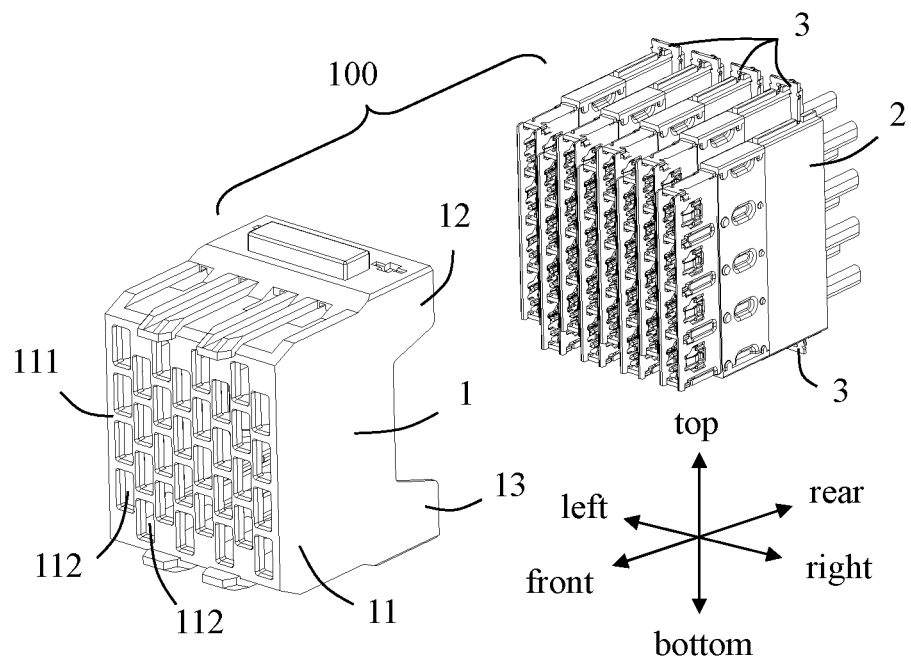
FIG. 3 is a partial perspective exploded view of the first electrical connector in FIG. 2, in which a first housing is separated.
Figure 4:
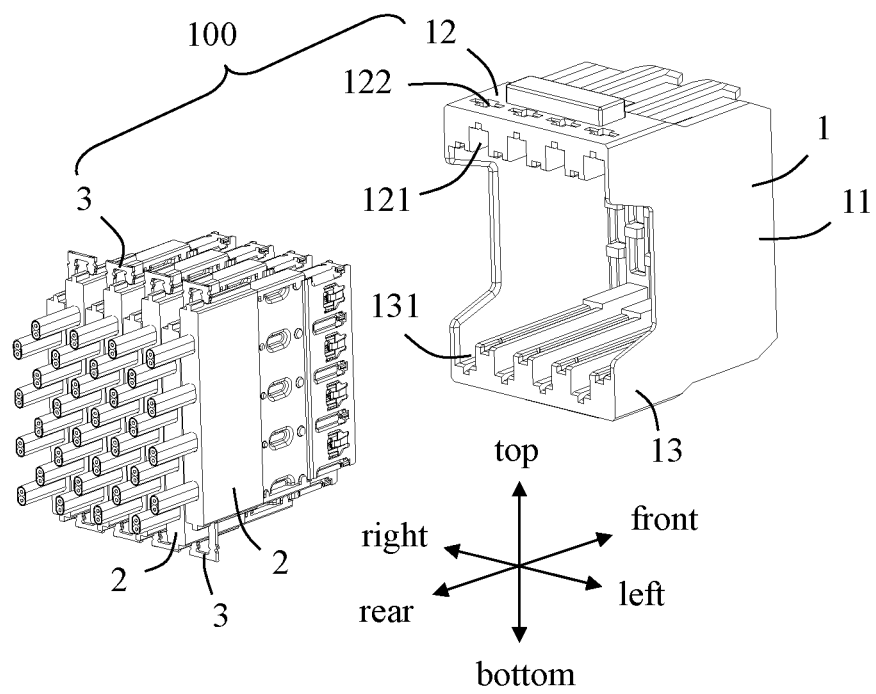
FIG. 4 is a partially exploded perspective view of FIG. 3 from another angle.

Referring to FIGS. 3 and 4, the first electrical connector 100 includes a first housing 1, a plurality of first mating modules 2 mounted to the first housing 1, and a plurality of first positioning pieces 3 for positioning the first mating modules 2 in the first housing 1.

Referring to FIGS. 3 to 6, the first housing 1 is made of insulating material, and includes a first body portion 11, a first wall portion 12 extending rearwardly from one end (for example, an upper end) of the first body portion 11, and a second wall portion 13 extending rearwardly from the other end (for example, a lower end) of the first body portion 11. The first body portion 11 includes a mating surface 111 and a plurality of first terminal receiving grooves 112 extending through the mating surface 111. In the illustrated embodiment of the present disclosure, the first terminal receiving grooves 112 are disposed in multiple rows along a vertical direction. Two adjacent rows of first terminal receiving grooves 112 are staggered in a left-right direction. That is, the first terminal receiving grooves 112 at corresponding positions in two adjacent rows of the first terminal receiving grooves 112 are not aligned in the left-right direction. The first wall portion 12 includes a plurality of first slots 121, a plurality of first locking slots 122 communicating with the first slots 121, and a plurality of first positioning slots 123 for positioning the corresponding first mating modules 2. The second wall portion 13 includes a plurality of second slots 131, a plurality of second locking slot 132 communicating with the second slots 131, and a plurality of second positioning slots 133 for positioning the corresponding first mating modules 2. The first slots 121 and the second slots 131 extend in the front-rear direction. The first slot 121 and the second slot 131 which are in alignment with each other in the vertical direction are used for receiving one first mating module 2. The first locking slots 122 and the second locking slots 132 extend along the vertical direction. The first locking slots 122 extend through the first wall portion 12 along the vertical direction so as to communicate with the corresponding first slots 121. The second locking slots 132 extend through the second wall portion 13 along the vertical direction so as to communicate with the corresponding second slots 131.

Figure 7:
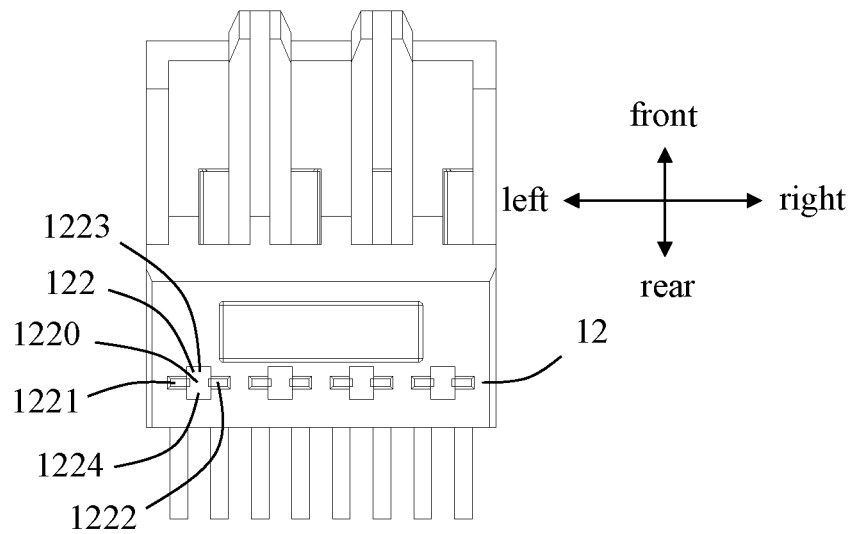
FIG. 7 is a top view of the first electrical connector after removing the first positioning pieces.

As shown in FIG. 7, in the illustrated embodiment of the present disclosure, each first locking slot 122 is roughly cross-shaped, and includes a first intermediate slot portion 1220, a first slot portion 1221 located on one side (i.e., a left side) of the first intermediate slot portion 1220 along a first direction (i.e., the left-right direction), a second slot portion 1222 located on the other side (i.e., a right side) of the first intermediate slot portion 1220 along the first direction, a first slotted portion 1223 located on one side (i.e., a front side) of the first intermediate slot portion 1220 along a second direction (i.e., the front-rear direction), and a second slotted portion 1224 located on the other side (i.e., a rear side) of the first intermediate slot portion 1220 along the second direction. Regarding one first locking slot 122, the first slot portion 1221, the first intermediate slot portion 1220 and the second slot portion 1222 are communicated in the left-right direction. The first slotted portion 1223, the first intermediate slot portion 1220 and the second slotted portion 1224 are communicated in the front-rear direction. The first slot portion 1221 and the second slot portion 1222 both extend through the first wall portion 12 along the vertical direction so as to communicate with the corresponding first slot 121. The first intermediate slot portion 1220 does not extend downwardly through the first wall portion 12, so that a surface of the first wall portion 12 located in the first intermediate slot portion 1220 can limit the corresponding first positioning piece 3. In addition, by providing the first slotted portion 1223 and the second slotted portion 1224 in the present disclosure, it is advantageous to clamp the first positioning piece 3 by a clamp, and to assemble or disassemble the first positioning piece 3 in the first locking slot 122.

Figure 8:
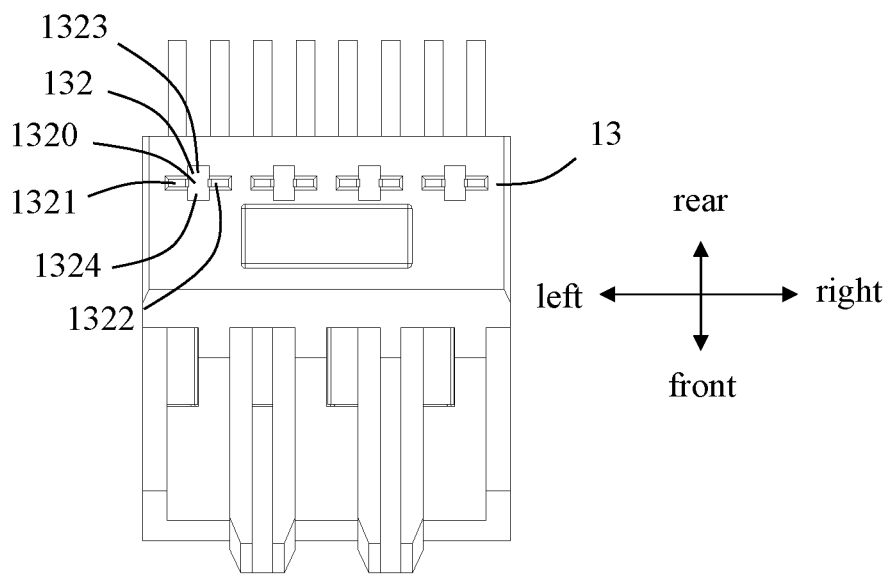
FIG. 8 is a bottom view of the first electrical connector after removing the first positioning pieces.

Similarly, referring to FIG. 8, each second locking slot 132 is roughly cross-shaped, and includes a second intermediate slot portion 1320, a third slot portion 1321 located on one side (i.e., the left side) of the second intermediate slot portion 1320 along the first direction (i.e., the left-right direction), a fourth slot portion 1322 located on the other side (i.e., the right side) of the second intermediate slot portion 1320 along the first direction, a third slotted portion 1323 located on one side (i.e., the front side) of the second intermediate slot portion 1320 along the second direction (i.e., the front-rear direction), and a fourth slotted portion 1324 located on the other side (i.e., the rear side) of the second intermediate slot portion 1320 along the second direction. Regarding one second locking slot 132, the third slot portion 1321, the second intermediate slot portion 1320 and the fourth slot portion 1322 are communicated in the left-right direction. The third slotted portion 1323, the second intermediate slot portion 1320 and the fourth slotted portion 1324 are communicated in the front-rear direction. The fourth slot portion 1322 extends through the second wall portion 13 along the vertical direction so as to communicate with the second slot 131. The third slot portion 1321 and the fourth slot portion 1322 both extend through the second wall portion 13 along the vertical direction so as to communicate with the corresponding second slot 131. The second intermediate slot portion 1320 does not extend upwardly through the second wall portion 13, so that a surface of the second wall portion 13 located in the second intermediate slot portion 1320 can limit the corresponding first positioning piece 3. In addition, by providing the third slotted portion 1323 and the fourth slotted portion 1324 in the present disclosure, it is advantageous to clamp the first positioning piece 3 by a clamp, and to assemble or disassemble the first positioning piece 3 in the second locking slot 132.

Figure 51:
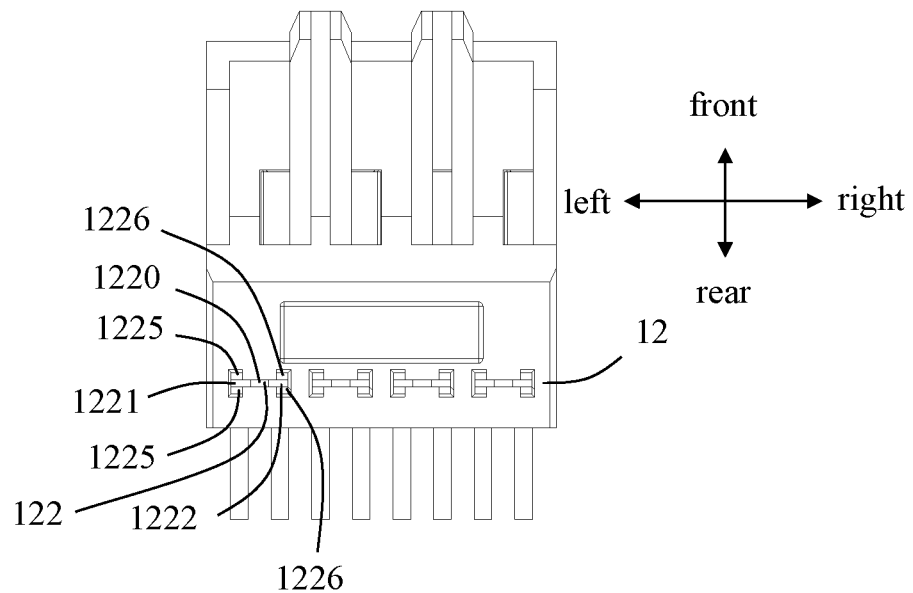
FIG. 51 is a top view of FIG. 7 in another embodiment.

In the illustrated embodiment of the present disclosure, the first locking slot 122 and the second locking slot 132 are substantially cross-shaped. Of course, in other embodiments, the first locking slot 122 may also be H-shaped. Specifically, referring to FIG. 51, the first locking slot 122 includes a first intermediate slot portion 1220, a first slot portion 1221 located on one side (i.e., the left side) of the first intermediate slot portion 1220 along the first direction (i.e., the left-right direction), a second slot portion 1222 located on the other side (i.e., the right side) of the first intermediate slot portion 1220 along the first direction, first opening portions 1225 located on both sides of the first slot portion 1221 along the second direction (i.e., the front-rear direction), and second opening portions 1226 located on both sides of the second slot portion 1222 along the second direction. Regarding one first locking slot 122, the first slot portion 1221, the first intermediate slot portion 1220 and the second slot portion 1222 are communicated in the left-right direction. The first intermediate slot portion 1220 does not extend downwardly through the first wall portion 12, so that a surface of the first wall portion 12 located in the first intermediate slot portion 1220 can limit the corresponding first positioning piece 3. In addition, in the present disclosure, by providing the first opening portion 1225 and the second opening portion 1226, it is advantageous to clamp the first positioning piece 3 by a clamp, and to assemble or disassemble the first positioning piece 3 in the first locking slot 122. The shape of the second locking slot 132 may be the same as the shape of the first locking slot 122, that is, the second locking slot 132 is also H-shaped, which will not be repeated in the present disclosure. Of course, in other embodiments, the first locking slot 122 and the second locking slot 132 may also have other shapes which are not limited by the present disclosure.

Figure 9:
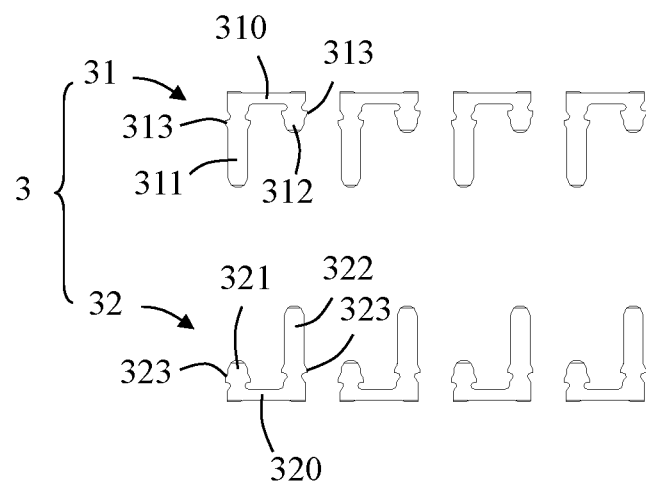
FIG. 9 is a front view of the first positioning pieces in accordance with an embodiment of the present disclosure.

Referring to FIG. 9, the first positioning piece 3 includes a plurality of first pin pieces 31 mating with the first locking slots 122 and a plurality of second pin pieces 32 mating with the second locking slots 132. Each first pin piece 31 is approximately in a shape of an inverted U, and includes a first pin piece portion 311 fixed in the first slot portion 1221, a second pin piece portion 312 fixed in the second slot portion 1222, and a first connecting portion 310 connecting the first pin piece portion 311 and the second pin piece portion 312. In the illustrated embodiment of the present disclosure, the first pin piece portion 311 and the second pin piece portion 312 respectively include a plurality of first barbs 313 in order to improve the holding force with the first wall portion 12. The first connecting portion 310 is received in the first intermediate slot portion 1220. In the illustrated embodiment of the present disclosure, lengths of the first pin piece portion 311 and the second pin piece portion 312 are different in order to correspond to different first mating modules 2.

Similarly, each second pin piece 32 is roughly U-shaped, and includes a third pin piece portion 321 fixed in the third slot portion 1321, a fourth pin piece portion 322 fixed in the fourth slot portion 1322, and a second connecting portion 320 connecting the third pin piece portion 321 and the fourth pin piece portion 322. In the illustrated embodiment of the present disclosure, the third pin piece portion 321 and the fourth pin piece portion 322 respectively include a plurality of second barbs 323 in order to improve the holding force with the second wall portion 13. The second connecting portion 320 is received in the second intermediate slot portion 1320. In the illustrated embodiment of the present disclosure, lengths of the third pin piece portion 321 and the fourth pin piece portion 322 are different in order to correspond to different first mating modules 2.

Figure 10:
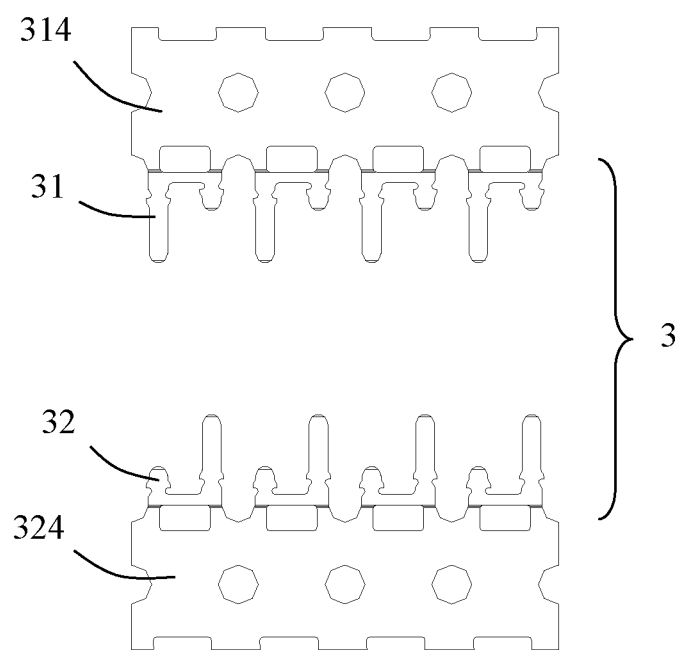
FIG. 10 is a front view of the first positioning pieces in accordance with another embodiment of the present disclosure.
Figure 11:
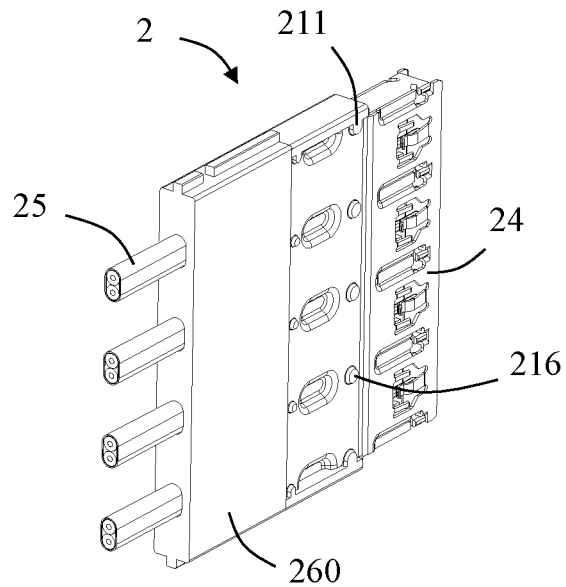
FIG. 11 is a perspective schematic view of a first mating module.
Figure 12:
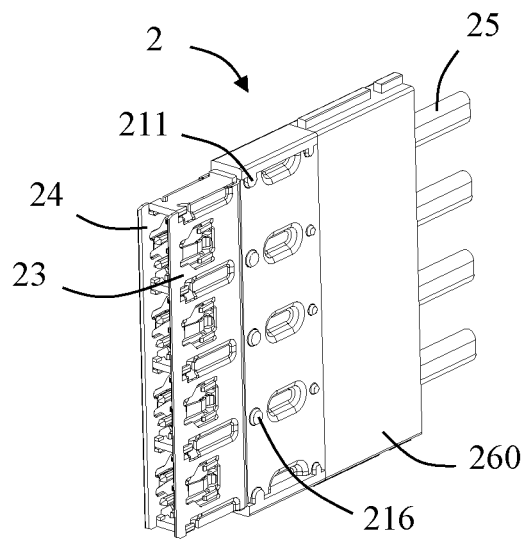
FIG. 12 is a perspective schematic view of FIG. 11 from another angle.

In an embodiment of the present disclosure, the first pin piece 31 and the second pin piece 32 are both stamped from a metal sheet. As shown in FIG. 9, in an embodiment, the plurality of first pin pieces 31 may be separately provided and separately installed in the corresponding first locking slots 122, respectively. The plurality of second pin pieces 32 may be separately provided and separately installed in the corresponding second locking slots 132, respectively. As shown in FIG. 10, in other embodiments, the plurality of first pin pieces 31 may also be connected as a whole by a first strip 314. The plurality of second pin pieces 32 can also be connected as a whole by a second strip 324. During assembly, the first pin piece 31 and the second pin piece 32 are integrally installed in the corresponding first locking slots 122 and the second locking slots 132, respectively, so as to improve the installation efficiency. After the assembly is completed, according to actual needs, the first strip 314 and the second strip 324 can be removed or retained.

Referring to FIGS. 11 to 14, each of the first mating modules 2 includes a first terminal module 20, a first metal shield 23 located on one side of the first terminal module 20, a second metal shield 24 located on the other side of the first terminal module 20, a plurality of first cables 25 connected to the first terminal module 20, and a first outer covering portion 260 partially covering the first terminal module 20, the first metal shield 23, the second metal shield 24 and the first cables 25.

Figure 13:
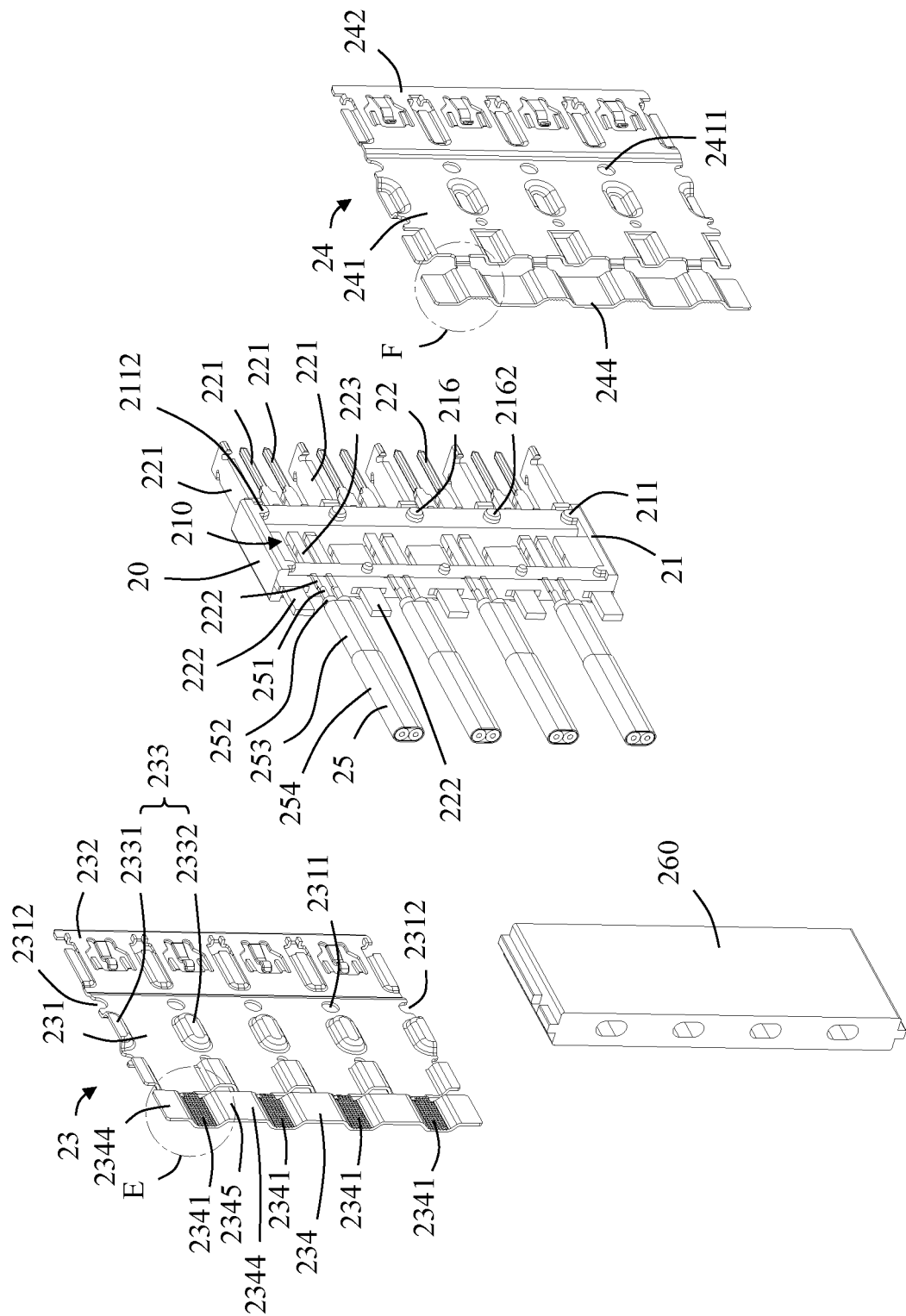
FIG. 13 is a partially exploded perspective view of FIG. 11.
Figure 14:
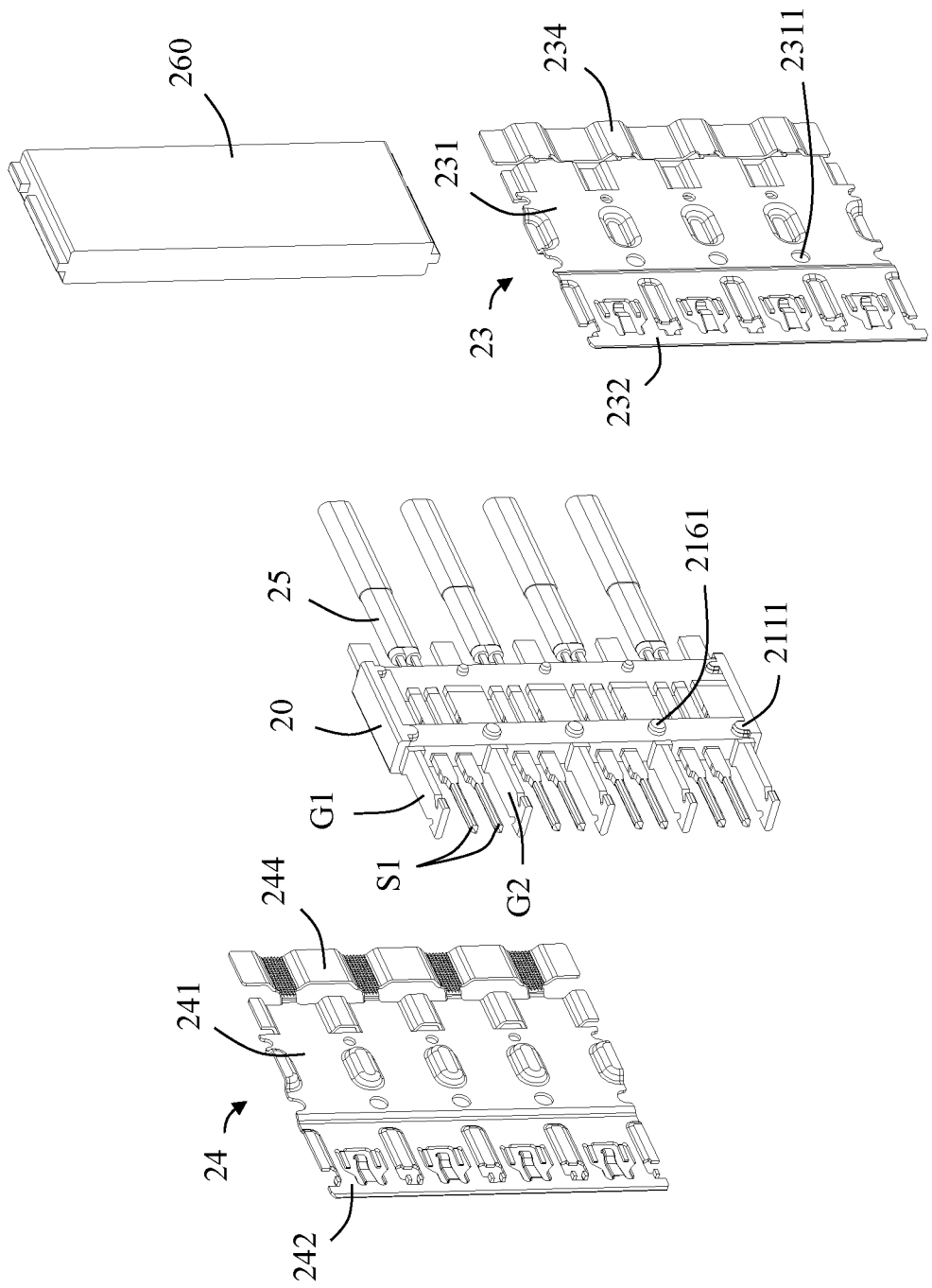
FIG. 14 is a partial perspective exploded view of FIG. 13 from another angle.

Referring to FIGS. 13 and 14, each first terminal module 20 includes an insulating bracket 21 and a plurality of first conductive terminals 22 fixed to the insulating bracket 21. The insulating bracket 21 is roughly frame-shaped and includes a hollow portion 210 and a plurality of posts 216. The posts 216 are adapted to fix and position the first metal shield 23 and the second metal shield 24. In the illustrated embodiment of the present disclosure, the posts 216 are substantially cylindrical. The posts 216 include a plurality of first posts 2161 and a plurality of second posts 2162. The first posts 2161 and the second posts 2162 are respectively located on two opposite sides of the insulating bracket 21 so as to mate with the first metal shield 23 and the second metal shield 24, respectively. In addition, the insulating bracket 21 also includes a plurality of positioning protrusions 211 respectively located at the top and the bottom thereof. The positioning protrusions 211 include a plurality of first positioning protrusions 2111 and a plurality of second positioning protrusions 2112. The first positioning protrusions 2111 and the second positioning protrusions 2112 are located on two opposite sides of the insulating bracket 21, respectively.

Figure 15:
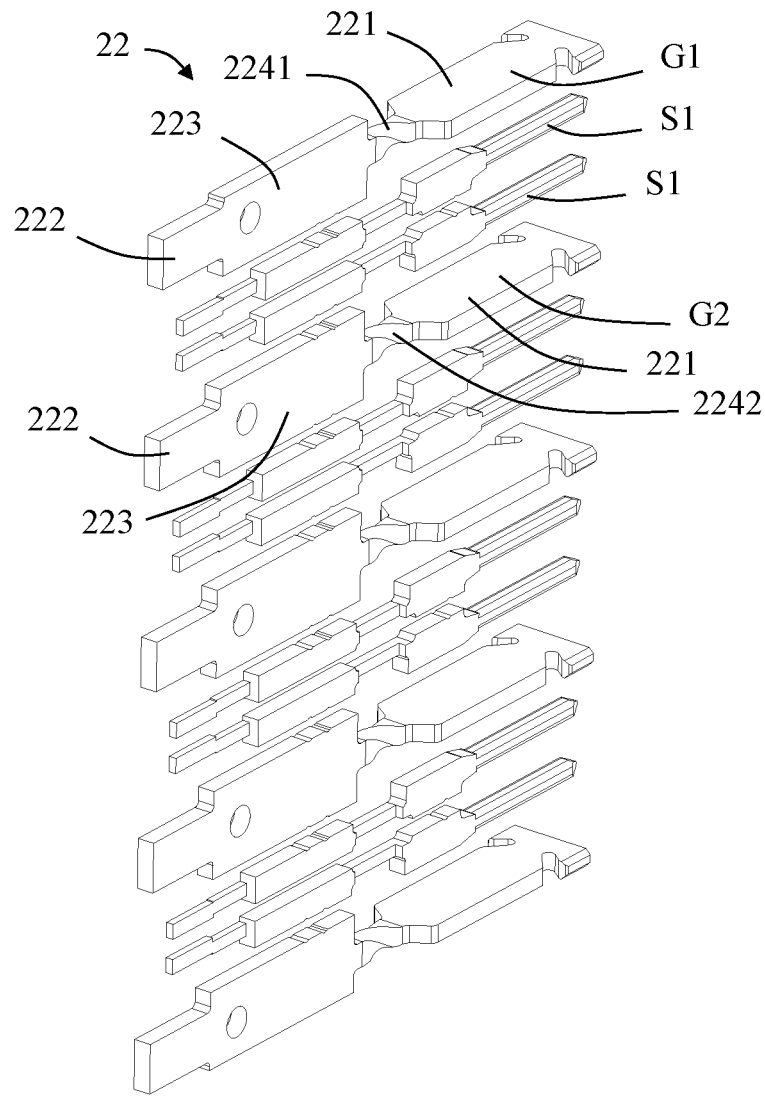
FIG. 15 is a perspective schematic view of first conductive terminals in FIG. 13.
Figure 17:
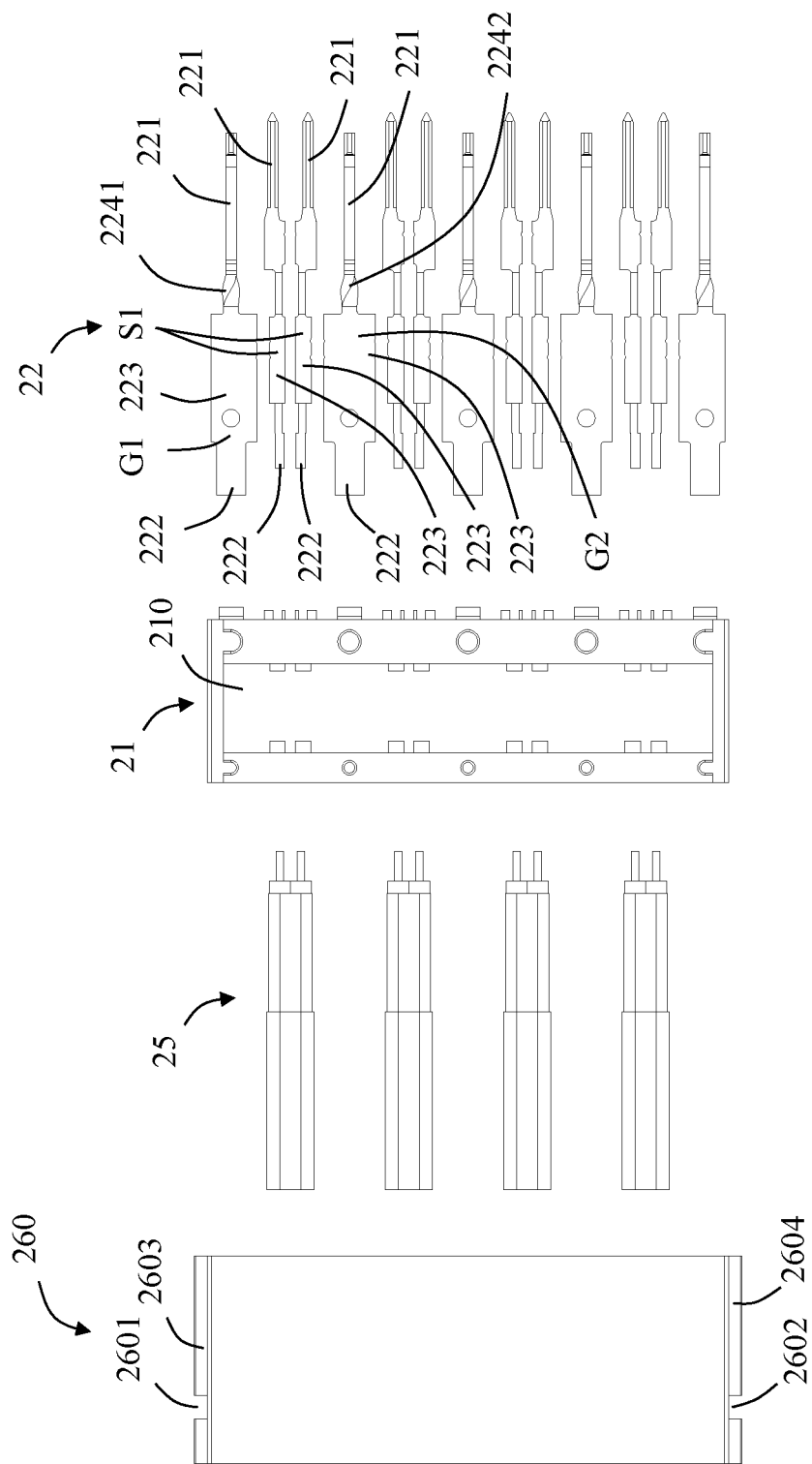
FIG. 17 is a side view of the first conductive terminals, an insulating bracket, the first cables and a first outer covering portion which are separated from each other.

Referring to FIGS. 15 and 17, each group of first conductive terminals 22 include a first mating portion 221, a first tail portion 222, and a first connection portion 223 located between the first mating portion 221 and the first tail portion 222. The first connection portions 223 of the first conductive terminals 22 are fixed to the insulating bracket 21. The first connection portions 223 are partially exposed in the hollow portion 210 in order to adjust impedance.

The first mating portion 221 extends forwardly and protrudes beyond the insulating bracket 21 for mating with the second electrical connector 200. The first tail portion 222 extends backwardly and protrudes beyond the insulating bracket 21 for being electrically connected to the first cable 25. In the illustrated embodiment of the present disclosure, each first conductive terminal 22 is of a straight configuration and extends along the front-rear direction.

Each group of first conductive terminals 22 include a plurality of first ground terminals G1, a plurality of second ground terminals G2, and a plurality of first signal terminals S1. In the illustrated embodiment of the present disclosure, two adjacent first signal terminals S1 form a pair of first differential signal terminals. Each pair of first differential signal terminals are located between one first ground terminal G1 and one second ground terminal G2. That is, each group of first conductive terminals 22 are arranged in a manner of G1-S1-S1-G2, which is beneficial to improve the quality of signal transmission. The first differential signal terminals are narrow-side coupling or wide-side coupling. A width of the first ground terminal G1 (for example, a spaced distance in a left-right direction) and a width the second ground terminal G2 (for example, the spaced distance in the left-right direction) are greater than a width of each first signal terminal S1 which is located between the first ground terminal G1 and the second ground terminal G2. Therefore, it is beneficial to increase the shielding area and improve the shielding effect.

In the illustrated embodiment of the present disclosure, the first connection portions 223 of the first conductive terminals 22 are partially insert-molded with the insulating bracket 21. Of course, in other embodiments, the first conductive terminals 22 may also be mounted to the insulating bracket 21 by means of assembling or the like. In the illustrated embodiment of the present disclosure, the first contact portion 221 of the first signal terminal S1 is substantially needle-shaped. The first contact portion 221 of the first ground terminal G1 and the first contact portion 221 of the second ground terminal G2 are substantially flat-shaped. The first contact portion 221 of the first signal terminal S1 and the first connection portion 223 of the first conductive terminal 22 are both coplanar, which means they are located in a same first plane (for example, a vertical plane). It should be noted that the technical term "coplanar" used in the present disclosure is intended to indicate that related components are substantially flush, which includes situations of incomplete coplanarity caused by manufacturing tolerances. In the illustrated embodiment of the present disclosure, the first ground terminal G1 includes a first torsion portion 2241 connecting its first contact portion 221 and its first connection portion 223, so that the first contact portion 221 of the first ground terminal G1 is located in a second plane (for example, a horizontal plane) perpendicular to the first plane. The second ground terminal G2 includes a second torsion portion 2242 connecting its first contact portion 221 and its first connection portion 223, so that the first contact portion 221 of the second ground terminal G2 is also located in the second plane (for example, the horizontal plane) perpendicular to the first plane. The first contact portion 221 of the first ground terminal G1 and the first contact portion 221 of the second ground terminal G2 are parallel to each other.

In the illustrated embodiment of the present disclosure, the first metal shield 23 and the second metal shield 24 are symmetrically disposed on opposite sides of the insulating bracket 21. Referring to FIGS. 13, 14, 18 and 19, the first metal shield 23 includes a first main body portion 231 and a first extension portion 232 extending forwardly from a front edge of the first main body portion 231, and a first extension tail 234 extending rearwardly from a rear edge of the first main body portion 231. The first main body portion 231 is located on one side of the first connection portions 223 of the first conductive terminals 22. The first extension portion 232 is located on one side of the first contact portions 221 of the first conductive terminals 22. The first extension tail 234 is located on one side of the first tail portions 222 of the first conductive terminals 22. In the illustrated embodiment of the present disclosure, the first extension portion 232 and the first main body portion 231 are located in different planes, in which the first extension portion 232 is farther away from the second metal shield 24 than the first main body portion 231. The first extension tail 234 is closer to the second metal shield 24 than the first main body portion 231. The first main body portion 231 includes a plurality of first mounting holes 2311 mating with the plurality of first posts 2161. The first posts 2161 are fixed and positioned in the first mounting holes 2311 by soldering, so that the fixing and positioning of the first metal shield 23 and the insulating bracket 21 are realized. The first main body portion 231 includes a plurality of ribs 233. The ribs 233 include a plurality of first ribs 2331 protruding toward the first ground terminals G1 and a plurality of second ribs 2332 protruding toward the second ground terminals G2. The first ribs 2331 corresponding to the first ground terminal G1 are disposed along an extending direction of the first connection portion 223 of the first ground terminal G1. The second ribs 2332 corresponding to the second ground terminal G2 are disposed along an extending direction of the first connection portion 223 of the second ground terminal G2. The second ribs 2332 are provided along the extending direction of the first connection portion 223 of the second ground terminal G2. In the illustrated embodiment of the present disclosure, the first ribs 2331 and the second ribs 2332 are formed by stamping the first main body portion 231. The first ribs 2331 and the second ribs 2332 protrude toward the second metal shield 24. The first ribs 2331 and the second ribs 2332 are disposed discontinuously along the extending direction of the first connection portion 223 of the first ground terminal G1 and the extending direction of the first connection portion 223 of the second ground terminal G2 in order to achieve multi-position contact. Therefore, the contact reliability between the first metal shield 23 and the first ground terminal G1, and the contact reliability between the first metal shield 23 and the second ground terminal G2 are improved. In the illustrated embodiment of the present disclosure, referring to FIG. 29, a wall thickness of the first rib 2331, a wall thickness of the second rib 2332, and a wall thickness of a portion of the first main body portion 231 located between the first rib 2331 and the second rib 2332 are the same. In addition, upper and lower edges of the first main body portion 231 further include a plurality of first positioning notches 2312 which mate with the first positioning protrusions 2111 of the insulating bracket 21.

The first extension portion 232 includes a plurality of first bulges 2321 protruding toward the corresponding first contact portions 221 of the first ground terminals G1, a plurality of second bulges 2322 protruding toward the corresponding first contact portions 221 of the second ground terminals G2, and a plurality of first elastic pieces 2323 each of which is located between adjacent first bulge 2321 and second bulge 2322. The first elastic pieces 2323 extend toward the first main body portion 231. Each first elastic piece 2323 includes an arc-shaped mating portion 2324. In the illustrated embodiment of the present disclosure, the first extension portion 232 further includes two first protruding tabs 2325 located at opposite sides of each first elastic piece 2323. The first protruding tabs 2325 and the first elastic pieces 2323 extend along opposite directions. The first protruding tabs 2325 protrude sidewardly to contact the adjacent first terminal module 2 so as to improve the shielding effect. In the illustrated embodiment of the present disclosure, referring to FIG. 31, a wall thickness of the first bulge 2321, a wall thickness of the second bulge 2322, and a wall thickness of a portion of the first extension portion 232 located between the first bulge 2321 and the second bulge 2322 are the same. In addition, the first extension portion 232 further includes a first abutting block 2326a and a second abutting block 2327a. Corresponding to one first ground terminal G1 and one second ground terminal G2, the number of the first abutting block 2326a and the second abutting block 2327a may be one or two. The first abutting block 2326a and the second abutting block 2327a are used to abut against or clamp the corresponding mating portions 221 of the first ground terminal G1 and the second ground terminal G2 along the vertical direction so as to achieve position limit.

Figure 26:
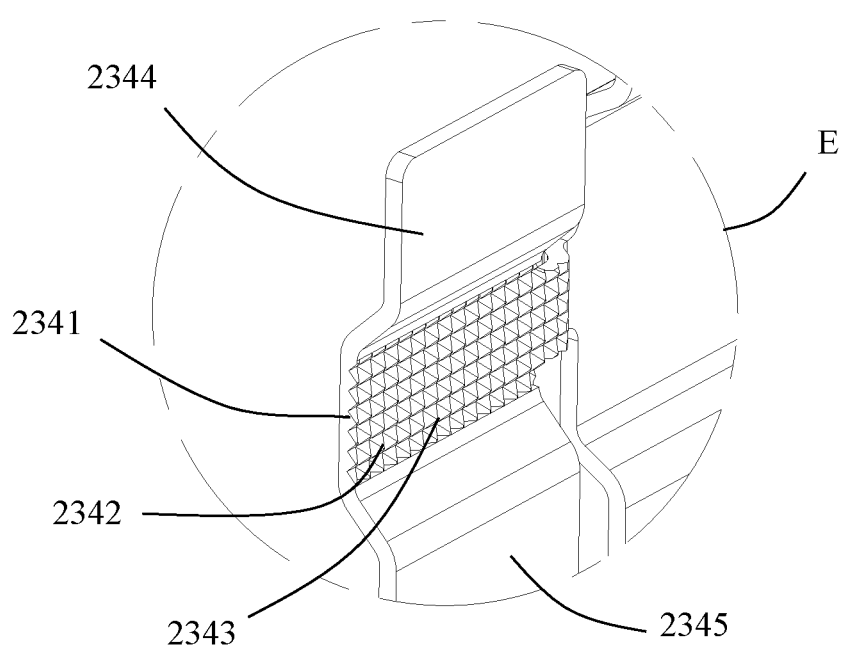
FIG. 26 is a partial enlarged view of a circled portion E in FIG. 13.

Referring to FIG. 26, in the illustrated embodiment of the present disclosure, the first extension tail 234 includes a plurality of first abutting portions 2341 and a plurality of first protrusions 2342 extending in a direction toward the second metal shield 24. The first protrusions 2342 are saw teeth each of which includes a substantially pyramid-shaped tip portion 2343.

Figure 18:
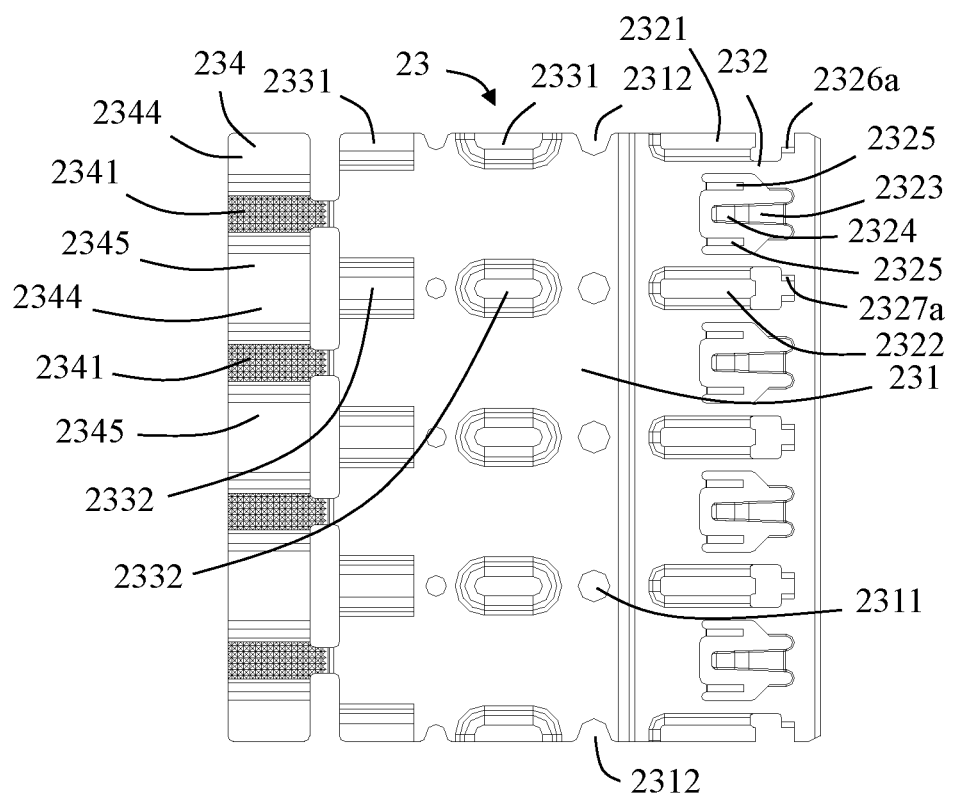
FIG. 18 is a right side view of a first metal shield of the first electrical connector in FIG. 13.
Figure 19:
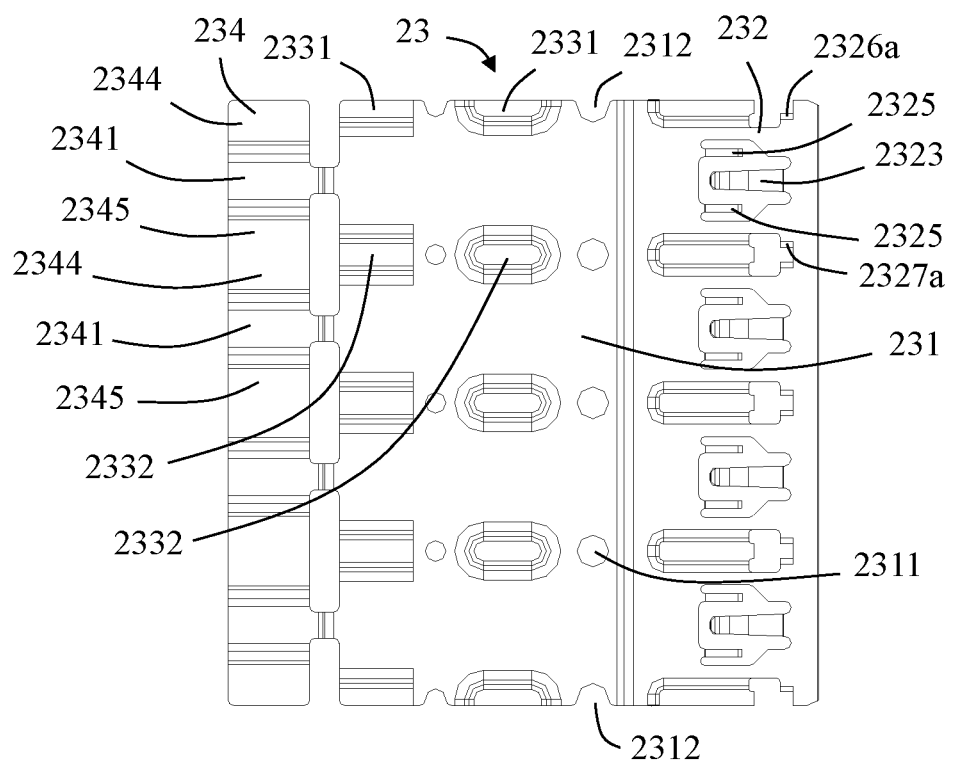
FIG. 19 is a side view of the first metal shield of the first electrical connector in FIG. 13 from another angle.

Referring to FIGS. 18 and 19, in an embodiment of the present disclosure, the first extension tail 234 further includes a plurality of first bridge portions 2344 and a plurality of second bridge portions 2345 extending from upper and lower sides of the first abutting portions 2341, respectively. The adjacent first bridge portion 2344 and second bridge portion 2345 are connected together. By providing the first bridge portions 2344 and the second bridge portions 2345, on the one hand, the grounding area of the first extension tail 234 is increased, thus the shielding effect is improved; on the other hand, the first extension tail 234 can be connected as a whole along the vertical direction, thereby improving the structural strength. In the illustrated embodiment of the present disclosure, the first bridge portions 2344 and the second bridge portions 2345 are located in a same vertical plane. The plurality of first abutting portions 2341 are located in a different vertical plane.

Similarly, referring to FIGS. 13, 14, 20 and 21, the second metal shield 24 includes a second main body portion 241 and a second extension portion 242 extending forwardly from a front edge of the second main body portion 241, and a second extension tail 244 extending rearwardly from a rear edge of the second main body portion 241. The second main body portion 241 is located on the other side of the first connection portions 223 of the first conductive terminals 22. The second extension portion 242 is located on the other side of the first contact portions 221 of the first conductive terminals 22. The second extension tail 244 is located on the other side of the first tail portions 222 of the first conductive terminals 22. In the illustrated embodiment of the present disclosure, the second extension portion 242 and the second main body portion 241 are located in different planes, in which the second extension portion 242 is farther away from the first metal shield 23 than the second main body portion 241. The second extension tail 244 is closer to the first metal shield 23 than the second main body portion 241. The second main body portion 241 includes a plurality of second mounting holes 2411 mating with the plurality of second posts 2162. The second posts 2162 are fixed and positioned in the second mounting holes 2411 by soldering, so that the second metal shield 24 and the insulating bracket 21 are fixed and positioned. The second main body portion 241 includes a plurality of ribs 243. The ribs 243 include a plurality of third ribs 2431 protruding toward the first ground terminals G1 and a plurality of fourth ribs 2432 protruding toward the second ground terminals G2. The third ribs 2431 are disposed along the extending direction of the first connection portion 223 of the first ground terminal G1. The fourth ribs 2432 are disposed along the extending direction of the first connection portion 223 of the second ground terminal G2. In the illustrated embodiment of the present disclosure, the third ribs 2431 and the fourth ribs 2432 are formed by stamping the second main body portion 241. The third ribs 2431 and the fourth ribs 2432 protrude toward the first metal shield 23. The third ribs 2431 and the fourth ribs 2432 are discontinuously disposed along the extending direction of the first connection portion 223 of the first ground terminal G1 and the extending direction of the first connection portion 223 of the second ground terminal G2 so as to achieve multi-position contact. Therefore, the contact reliability of the second metal shield 24 and the first ground terminal G1, and the contact reliability of the second metal shield 24 and the second ground terminal G2 are improved. In the illustrated embodiment of the present disclosure, a wall thickness of the third rib 2431, a wall thickness of the fourth rib 2432, and a wall thickness of a portion of the second main body portion 241 located between the third rib 2431 and the fourth rib 2432 are the same. In an embodiment of the present disclosure, soldering is performed on surfaces of the ribs 233 and the ribs 243 so that the ribs 233 and the ribs 243 are soldered to the first ground terminal G1 and the second ground terminal G2, respectively. For example, soldering is performed on surfaces of the first ribs 2331, the second ribs 2332, the third ribs 2431 and the fourth ribs 2432, so that the first ribs 2331, the second ribs 2332, the third ribs 2431 and the fourth ribs 2432 are soldered to the first ground terminal G1 and the second ground terminal G2. The soldering method is at least one of spot soldering, laser soldering and ultrasonic soldering. In addition, upper and lower edges of the second main body portion 241 further respectively include a plurality of second positioning notches 2412 which mate with the second positioning protrusions 2112 of the insulating bracket 21.

The second extension portion 242 includes a plurality of third bulges 2421 protruding toward the first contact portions 221 of the first ground terminals G1, a plurality of fourth bulges 2422 protruding toward the first contact portions 221 of the second ground terminals G2, and a plurality of second elastic pieces 2423 each of which is located between adjacent third bulge 2421 and fourth bulge 2422. The second elastic pieces 2423 extend along directions toward the second main body portion 241. Each second elastic piece 2423 includes an arc-shaped mating portion 2424. In the illustrated embodiment of the present disclosure, the second extension portion 242 further includes two second protruding tabs 2425 located at opposite sides of each second elastic piece 2423. The second protruding tabs 2425 and the second elastic pieces 2423 extend along opposite directions. The second protruding tabs 2425 protrude sidewardly to contact the adjacent first terminal module 2 so as to improve the shielding effect. In the illustrated embodiment of the present disclosure, a wall thickness of the third bulge 2421, a wall thickness of the fourth bulge 2422, and a wall thickness of a portion of the second extension portion 242 located between the third bulge 2421 and the fourth bulge 2422 are the same.

In addition, the second extension portion 242 further includes a third abutting block 2426a and a fourth abutting block 2427a. Corresponding to one first ground terminal G1 and one second ground terminal G2, the number of the third abutting block 2426a and the fourth abutting block 2427a may be one or two. The third abutting block 2426a and the fourth abutting block 2427a are used to abut against or clamp the corresponding mating portions 221 of the first ground terminal G1 and the second ground terminal G2 along the vertical direction so as to achieve position limit.

Figure 27:
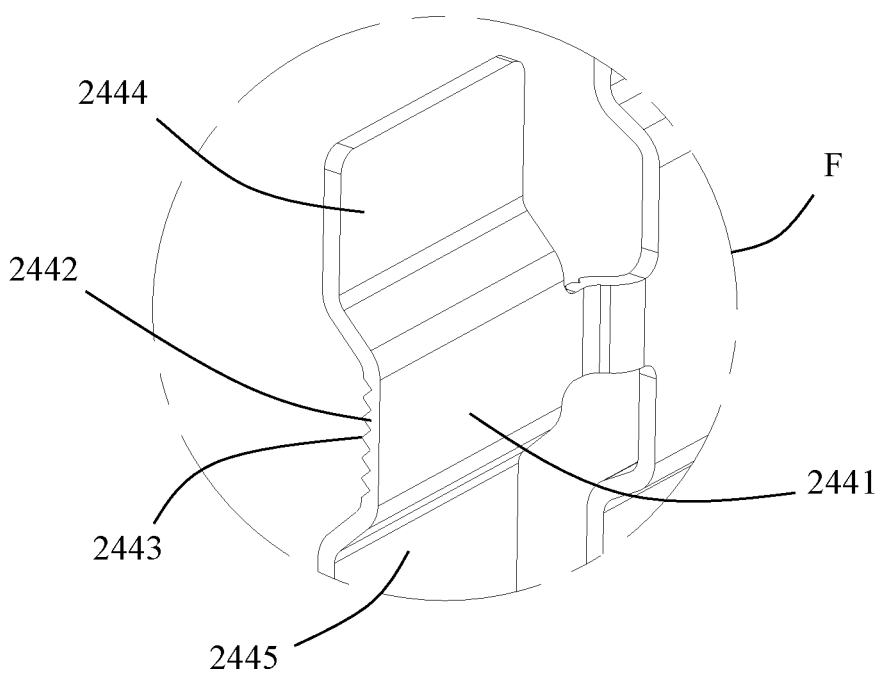
FIG. 27 is a partial enlarged view of a circled portion F in FIG. 13.

Referring to FIG. 27, in the illustrated embodiment of the present disclosure, the second extension tail 244 includes a plurality of second abutting portions 2441 and a plurality of second protrusions 2442 extending in a direction toward the first metal shield 23. The second protrusions 2442 are saw teeth each of which includes a substantially pyramid-shaped tip portion 2443.

Figure 20:
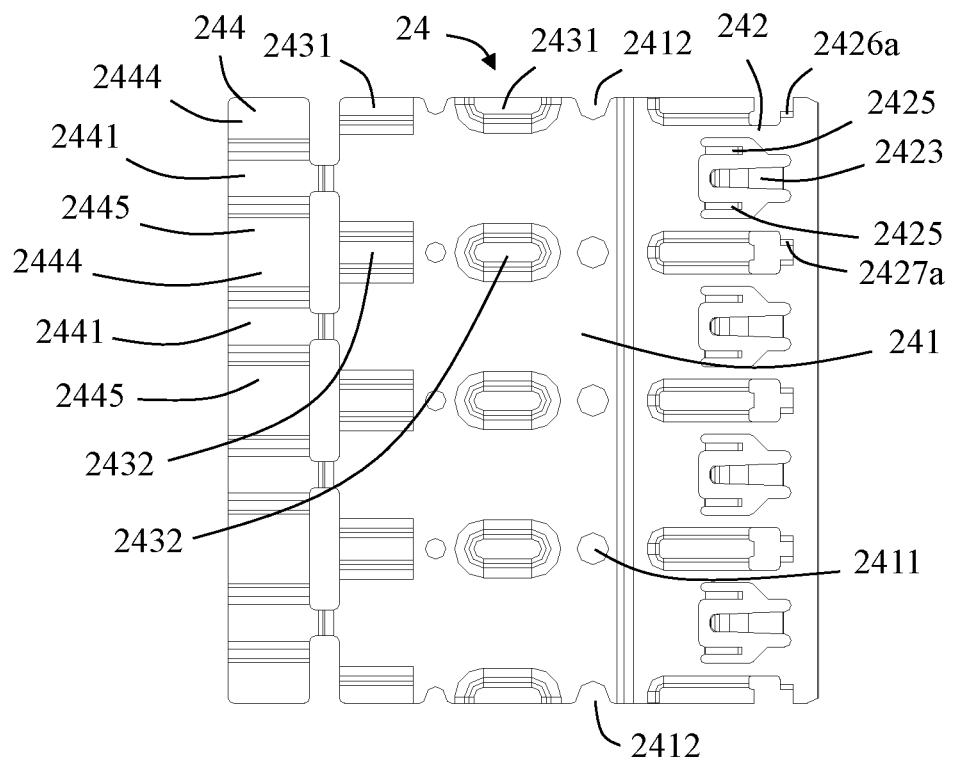
FIG. 20 is a right side view of a second metal shield of the first electrical connector in FIG. 13.
Figure 21:
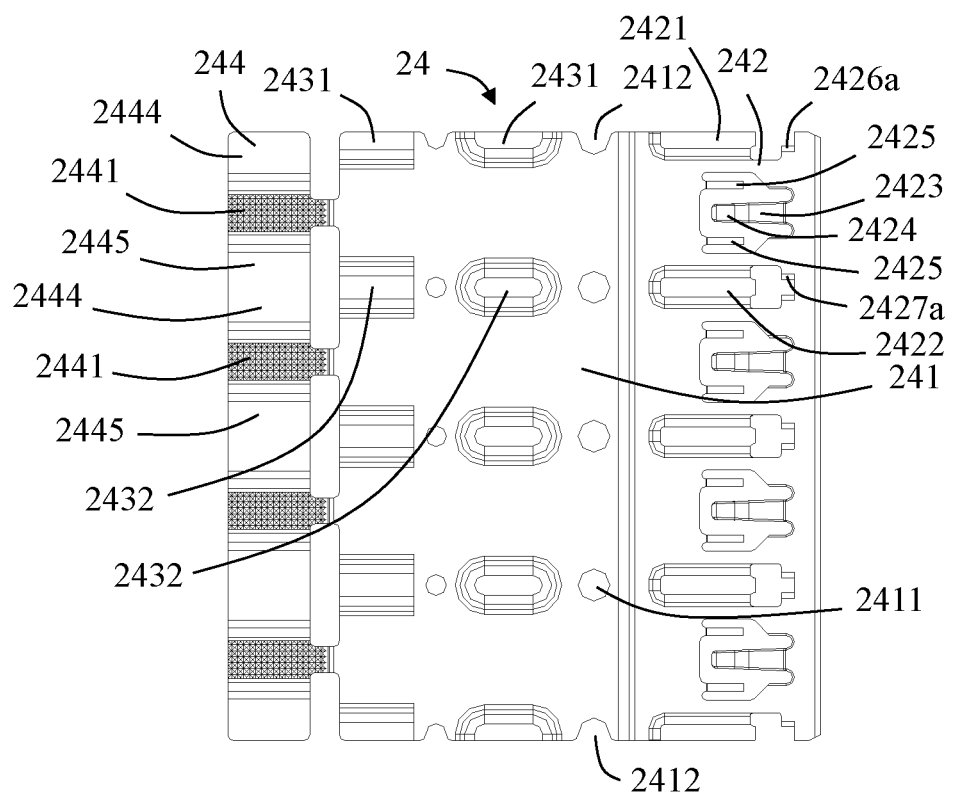
FIG. 21 is a side view of the first metal shield of the first electrical connector in FIG. 13 from another angle.

Referring to FIGS. 20 and 21, in an embodiment of the present disclosure, the second extension tail 244 further includes a plurality of third bridge portions 2444 and a plurality of fourth bridge portions 2445 extending from upper and lower sides of the second abutting portions 2441, respectively. The adjacent third bridge portion 2444 and fourth bridge portion 2445 are connected together. By providing the third bridge portions 2444 and the fourth bridge portions 2445, on the one hand, the grounding area of the second extension tail 244 is increased, thus the shielding effect is improved; on the other hand, the second extension tail 244 can be connected as a whole along the vertical direction, thereby improving the structural strength. In the illustrated embodiment of the present disclosure, the third bridge portions 2444 and the fourth bridge portions 2445 are located in a same vertical plane. The plurality of second abutting portions 2441 are located in another different vertical plane.

Figure 22:
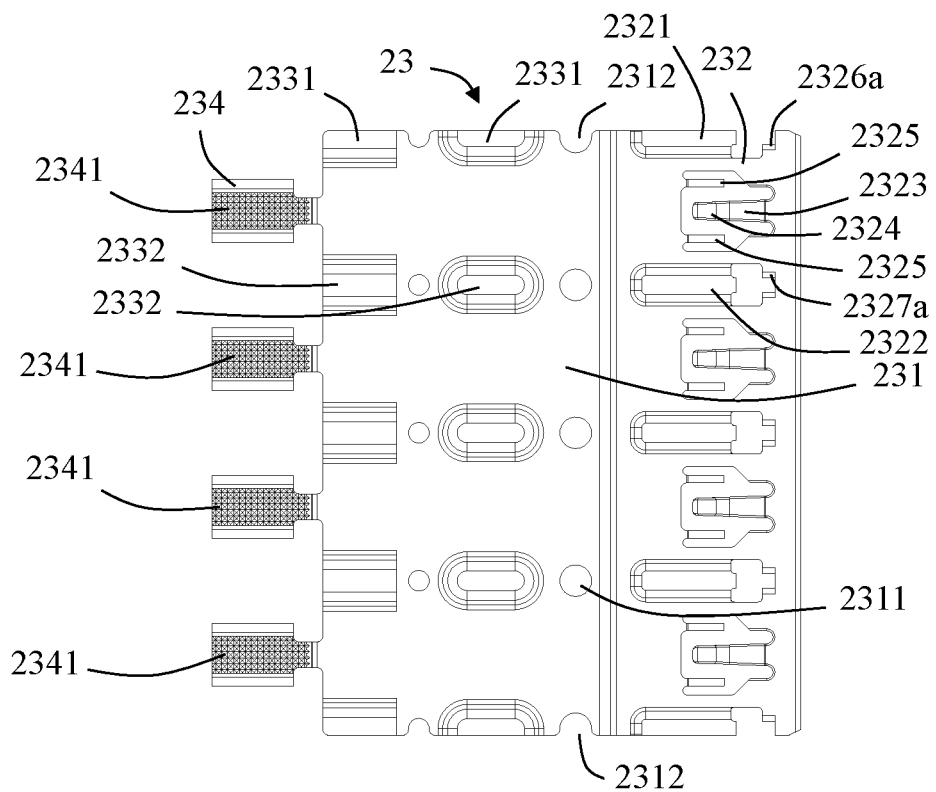
FIG. 22 is a right side view of the first metal shield in FIG. 18 in another embodiment.
Figure 23:
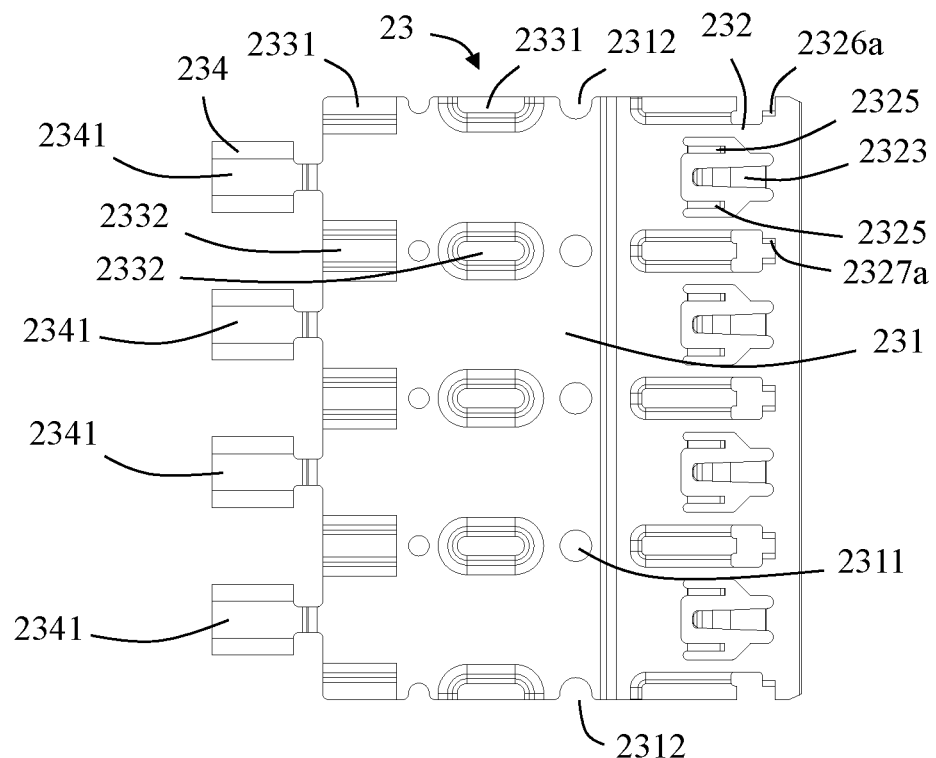
FIG. 23 is a side view of FIG. 22 from another angle.
Figure 24:
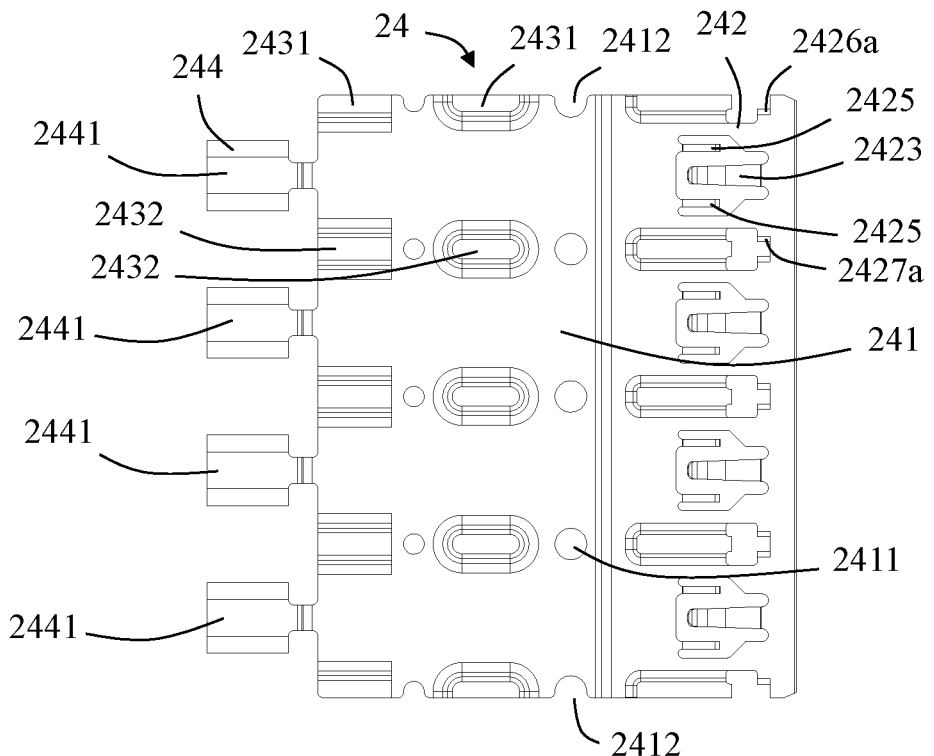
FIG. 24 is a right side view of the second metal shield in FIG. 20 in another embodiment.
Figure 25:
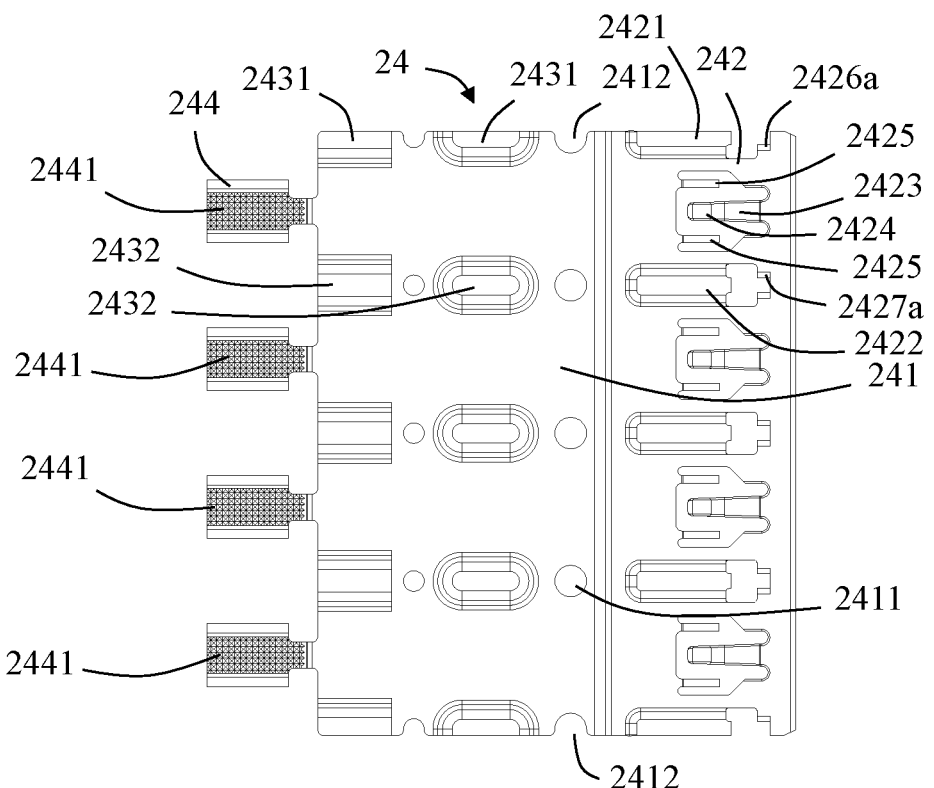
FIG. 25 is a side view of FIG. 24 from another angle.

Referring to FIGS. 22 and 23, in another embodiment of the first metal shield 23, the plurality of first abutting portions 2341 are spaced apart from each other in the vertical direction. Referring to FIGS. 24 and 25, in another embodiment of the second metal shield 24 of the present disclosure, the plurality of second abutting portions 2441 are spaced apart from each other in the vertical direction.

Figure 16:
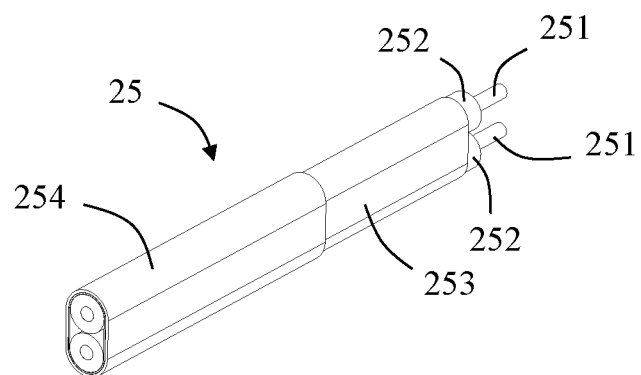
FIG. 16 is a perspective schematic view of a first cable.

Referring to FIG. 16, each of the first cables 25 includes first cores 251 for electrically connecting with the first tail portions 222 of the first differential signal terminals, first insulating layers 252 wrapped on the first cores 251, a first shielding layer 253 wrapped on the first insulating layers 252, and a first insulating outer layer 254 wrapped on a part of the first shielding layer 253. In an embodiment of the present disclosure, the first cores 251 are fixed to the first tail portions 222 of the first differential signal terminals by soldering. In the illustrated embodiment of the present disclosure, for each first cable 25 per se, the first shielding layer 253 is partially exposed to the first insulating outer layer 254 in order to be in contact with the first metal shield 23 and the second metal shield 24.

Referring to FIGS. 28 to 31, in the illustrated embodiment of the present disclosure, the first contact portion 221 and the first connection portion 223 of the first ground terminal G1 have a first wide surface 221a and a first narrow surface 221b perpendicular to the first wide surface 221a. The first contact portion 221 and the first connection portion 223 of the second ground terminal G2 have a second wide surface 221c and a second narrow surface 221d perpendicular to the second wide surface 221c. The first connection portions 223 of each pair of first differential signal terminals are located between the first narrow surface 221b of the first ground terminal G1 and the second narrow surface 221d of the second ground terminal G2 which are located on opposite sides of the first connection portions 223 of each pair of first differential signal terminals (referring to FIG. 29). The first contact portions 221 of each pair of first differential signal terminals are located between the first wide surface 221a of the first ground terminal G1 and the second wide surface 221c of the second ground terminal G2 which are located on opposite sides of the first contact portions 221 of each pair of first differential signal terminals (referring to FIG. 31). In the illustrated embodiment of the present disclosure, a width of the first wide surface 221a and a width of the second wide surface 221c are greater than a width of each first contact portion 221 of the first signal terminals S1, thereby better shielding can be provided for the first contact portions 221 of the first signal terminals S1.

Figure 28:
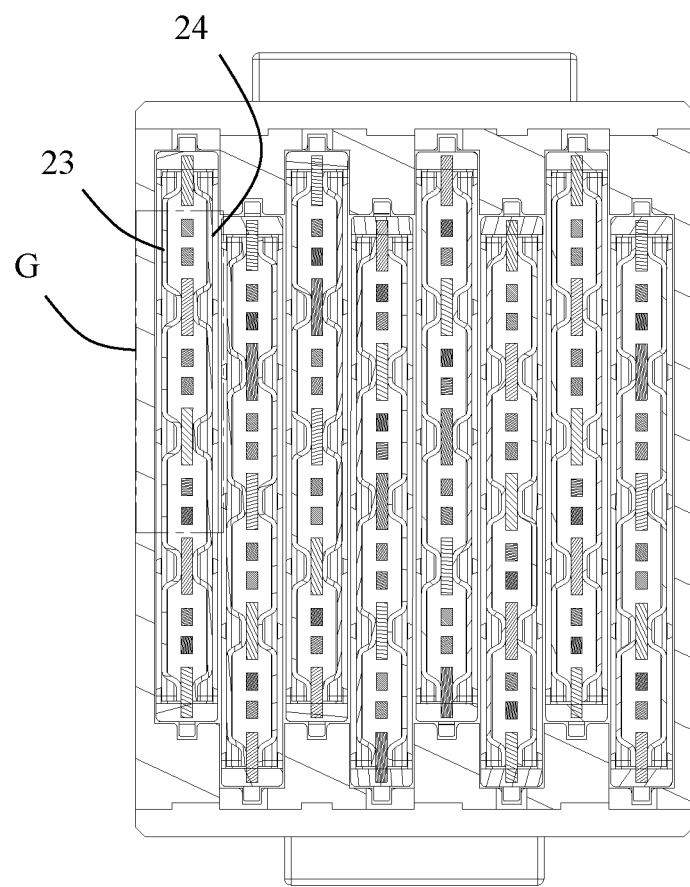
FIG. 28 is a schematic cross-sectional view taken along line B-B in FIG. 2.
Figure 29:
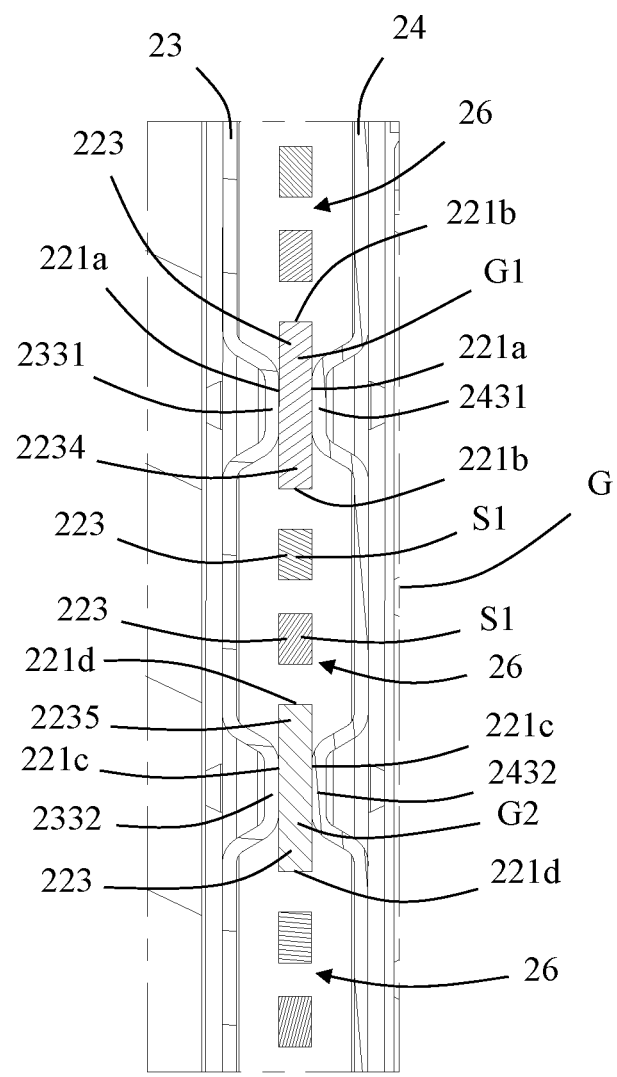
FIG. 29 is a partial enlarged view of a frame portion G in FIG. 28.

Referring to FIGS. 28 and 29, along a length of the first connection portion 223 of the first conductive terminal 22, the first rib 2331 of the first metal shield 23 and the third rib 2431 of the second metal shield 24 respectively contact two opposite sides of the first connection portion 223 of the first ground terminal G1, and the second rib 2332 of the first metal shield 23 and the fourth rib 2432 of the second metal shield 24 respectively contact two opposite sides of the first connection portion 223 of the second ground terminal G2, thereby forming a shielding cavity 26 surrounding the outer periphery of the first connection portions 223 of each pair of first differential signal terminals. In the illustrated embodiment of the present disclosure, the first rib 2331 and the third rib 2431 respectively contact the first wide surface 221a of the first connection portion 223 of the first ground terminal G1. The second rib 2332 and the fourth rib 2432 respectively contact the second wide surface 221c of the first connection portion 223 of the second ground terminal G2. In the illustrated embodiment of the present disclosure, the shielding cavity 26 is jointly formed by the first main body portion 231, the second main body portion 241, the first ground terminal G1 and the second ground terminal G2. The first connection portion 223 of the first ground terminal G1 includes a first tab portion 2234 protruding into the shielding cavity 26. The first connection portion 223 of the second ground terminal G2 includes a second tab portion 2235 protruding into the shielding cavity 26. The first connection portions 223 of the first differential signal terminals are located between the first tab portion 2234 and the second tab portion 2235. In the illustrated embodiment of the present disclosure, there are a plurality of the shielding cavities 26 which are disposed along an arrangement direction of each group of the first conductive terminals 22. Two adjacent shielding cavities 26 share a single first ground terminal G1 or a single second ground terminal G2. In addition, a part of the shared first ground terminal G1 protrudes into one shielding cavity 26, and another part of the shared first ground terminal G1 protrudes into another shielding cavity 26.

Figure 30:
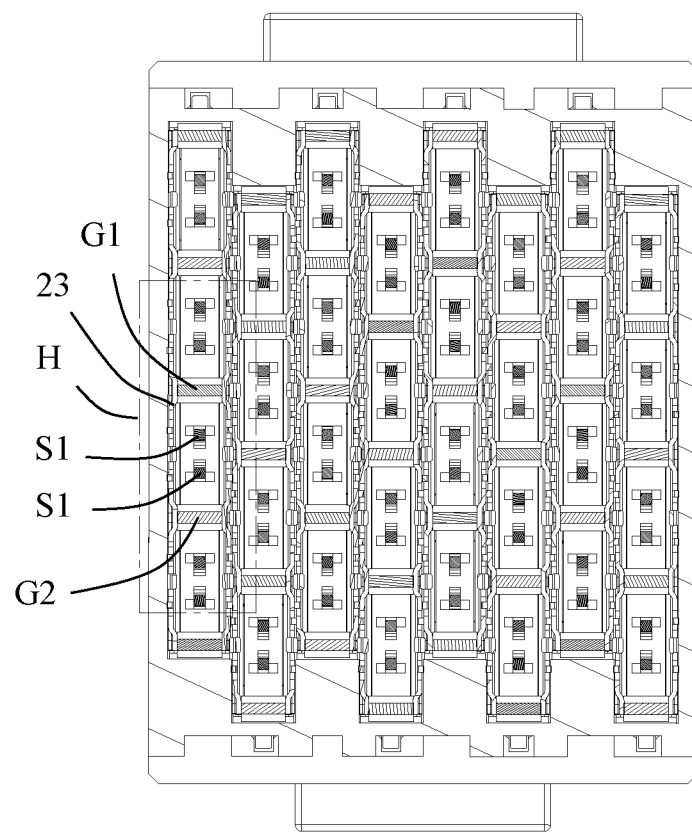
FIG. 30 is a schematic cross-sectional view taken along line C-C in FIG. 2.
Figure 31:
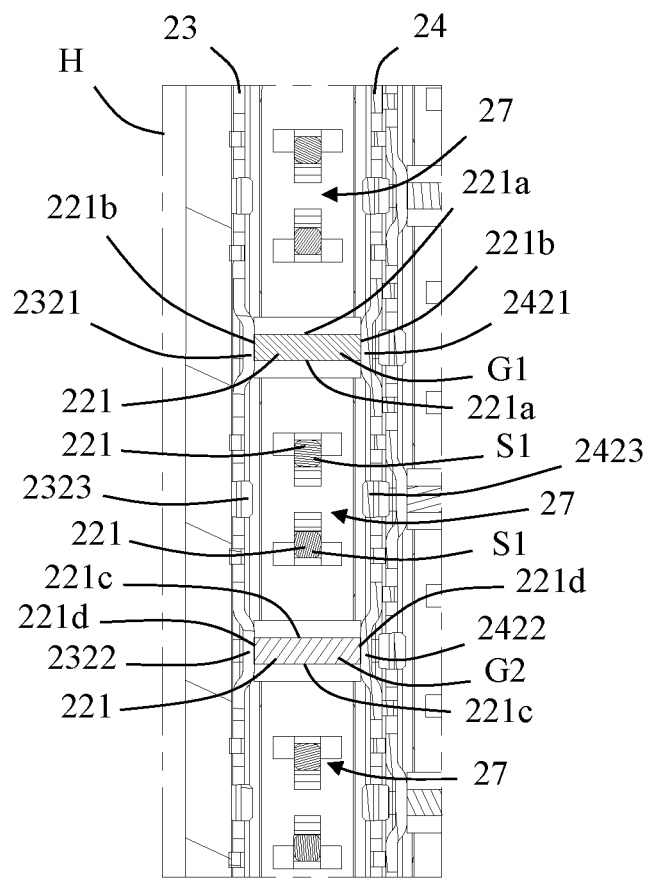
FIG. 31 is a partial enlarged view of a frame portion H in FIG. 30.

Referring to FIGS. 30 and 31, in the length of the first contact portion 221 of the first conductive terminal 22, the first bulge 2321 of the first metal shield 23 and the third bulge 2421 of the second metal shield 24 respectively contact two opposite side surfaces of the first contact portion 221 of the first ground terminal G1, and the second bulge 2322 of the first metal shield 23 and the fourth bulge 2422 of the second metal shield 24 respectively contact two opposite side surfaces of the first contact portion 221 of the second ground terminal G2. In the illustrated embodiment of the present disclosure, the first bulge 2321 of the first metal shield 23 and the third bulge 2421 of the second metal shield 24 respectively contact the first narrow surfaces 221b of the first contact portion 221 of the first ground terminal G1. The second bulge 2322 of the first metal shield 23 and the fourth bulge 2422 of the second metal shield 24 respectively contact the second narrow surfaces 221d of the first contact portion 221 of the second ground terminal G2. The first extension portion 232, the second extension portion 242, the first ground terminal G1 and the second ground terminal G2 jointly form a shielding space 27 for accommodating the corresponding first contact portions 221 of the first differential signal terminals. The first elastic piece 2323 and the second elastic piece 2423 extend into the shielding space 27. In the illustrated embodiment of the present disclosure, there are multiple shielding spaces 27 which are disposed along a stacking direction of each group of the first conductive terminals 22. Two adjacent shielding spaces 27 share a single first ground terminal G1 or a single second ground terminal G2. One first wide surface 221a of the first contact portion 221 of the shared first ground terminal G1 is exposed to the shielding space 27, and the other first wide surface 221a of the first contact portion 221 of the shared first ground terminal G1 is exposed to an adjacent shielding space 27. Similarly, a first wide surface 221c of the first contact portion 221 of the shared second ground terminal G2 is exposed to the adjacent shielding space 27, and the other wide surface 221c of the first contact portion 221 of the shared second ground terminal G2 is exposed to another adjacent shielding space 27.

Figure 32:
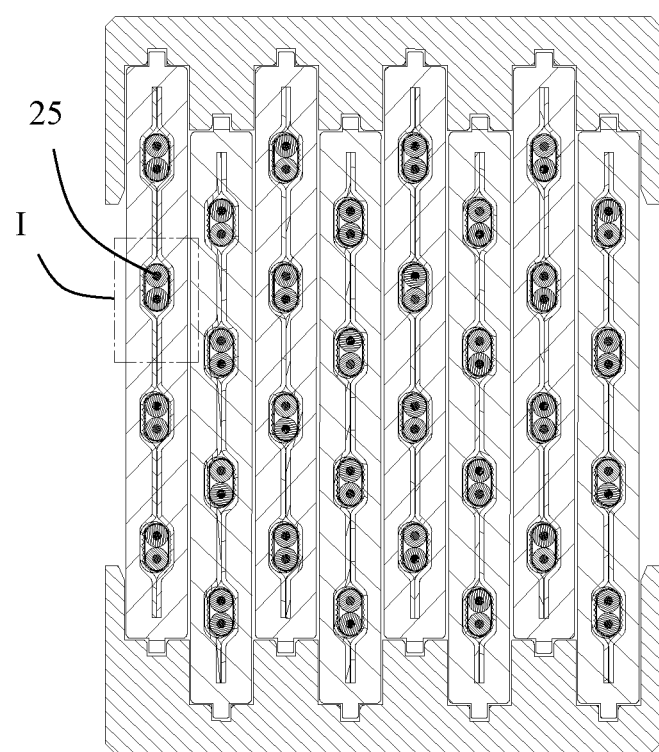
FIG. 32 is a schematic cross-sectional view taken along line D-D in FIG. 2.
Figure 33:
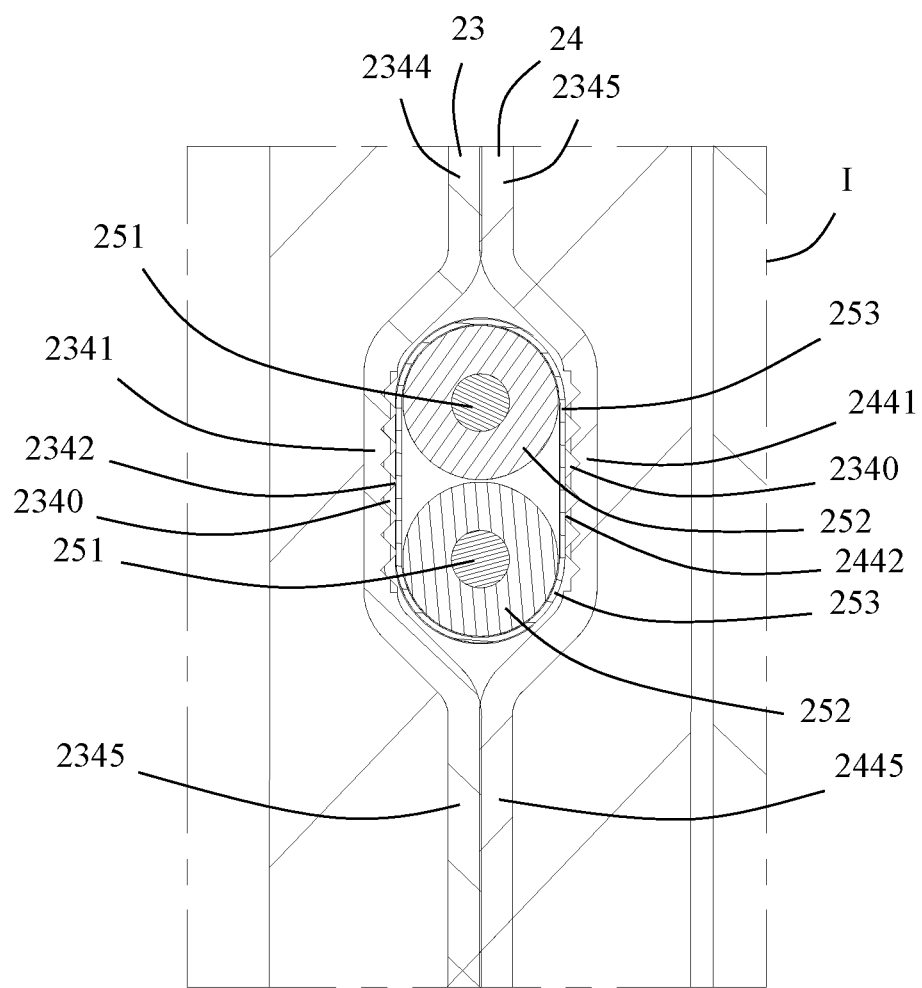
FIG. 33 is a partial enlarged view of a frame portion I in FIG. 32.

Referring to FIGS. 32 and 33, the first abutting portion 2341 of the first metal shield 23 and the second abutting portion 2441 of the second metal shield 24 are in contact with the corresponding first shielding layer 253 of the first cable 25. By such arrangement, it is beneficial to improve the shielding effect and improve the quality of signal transmission.

In the illustrated embodiment of the present disclosure, the first abutting portion 2341 of the first extension tail 234 and the second abutting portion 2441 of the second extension tail 244 jointly clamp the corresponding first shielding layer 253 of the first cable 25. The tip portions 2343 of the first protruding portion 2342 and the tip portions 2443 of the second protruding portion 2442 abut against the first shielding layer 253 of the first cable 25, so as to improve the holding force with the first shielding layer 253. Through this design, on the one hand, it can better improve the contact reliability; on the other hand, it is beneficial to prevent the first cable 25 from loosening. In addition, the tip portions 2343 of the first protruding portion 2342 and the tip portions 2443 of the second protruding portion 2442 pierce the corresponding first shielding layer 253 of the first cable 25, thereby further improving the holding force. In the illustrated embodiment of the present disclosure, by providing the saw teeth, when the tip portions 2343 of the first protruding portion 2342 and the tip portions 2443 of the second protruding portion 2442 abut against or pierce the first shielding layer 253 of the first cable 25, gaps 2340 formed between adjacent saw teeth can facilitate the injection of conductive slurry into the gaps 2340. Therefore, the electrical connection effect of the first extension tail 234, the second extension tail 244 and the first shielding layer 253 is further improved, and the contact reliability and holding force are further improved.

In addition, when the first abutting portions 2341 and the second abutting portions 2441 are spaced apart from each other in the vertical direction (referring to FIGS. 22 to 25), in order to increase the clamping force of the first abutting portions 2341 of the first extension tail 234 and the second abutting portions 2441 of the second extension tail 244, which jointly clamp the corresponding first shielding layer 253 of the first cable 25, the first insulating outer layer 254 further includes a plurality of heat-shrinkable sleeves (not shown) sleeved on the first abutting portions 2341 and the second abutting portions 2441 which are aligned along the left-right direction. By providing the heat-shrinkable sleeves, it is beneficial to form a long-term clamping force and improve the durability of products.

Referring to FIG. 17, the first outer covering portion 260 is partially wrapped around the first tail portions 222 of the first conductive terminals 22, the first extension tail 234 of the first metal shield 23, the second extension tail 244 of the second metal shield 24 and the first cables 25. Therefore, the integrity of the first mating module 2 is improved, which is beneficial to improve the assembly efficiency. The first outer covering portion 260 is made of insulating material, and includes a first positioning groove 2601 on a top surface thereof and a second positioning groove 2602 on a bottom surface thereof. In the illustrated embodiment of the present disclosure, the first outer covering portion 260 includes a first convex rib 2603 located on the top surface thereof, and a second convex rib 2604 located on the bottom surface thereof. The first positioning groove 2601 is formed on the first convex rib 2603. The second positioning groove 2602 is formed on the second convex rib 2604.

Figure 5:
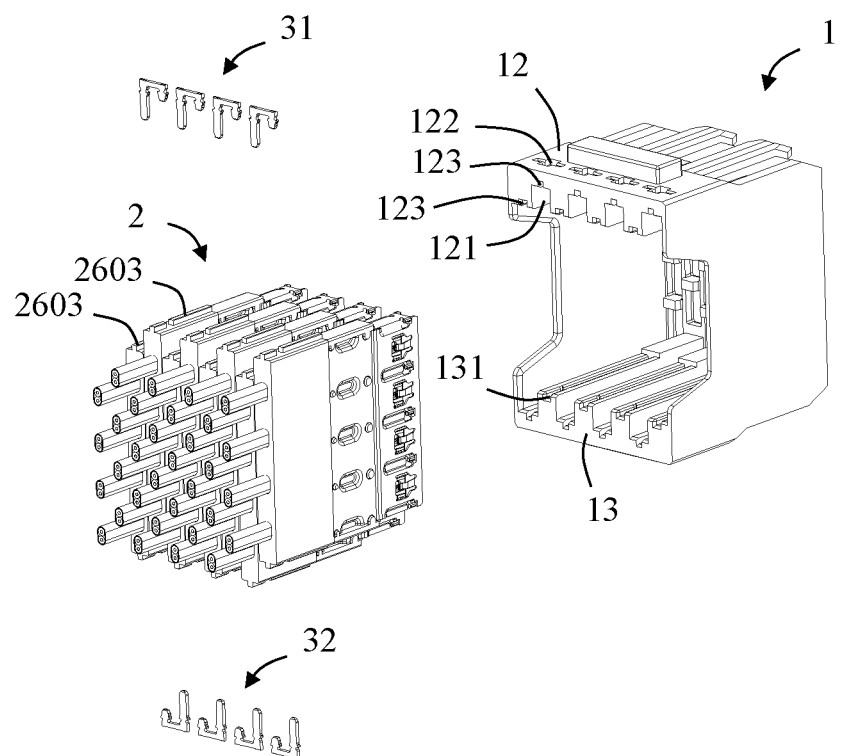
FIG. 5 is a further perspective exploded view of FIG. 4, in which a plurality of first positioning pieces are separated.
Figure 6:
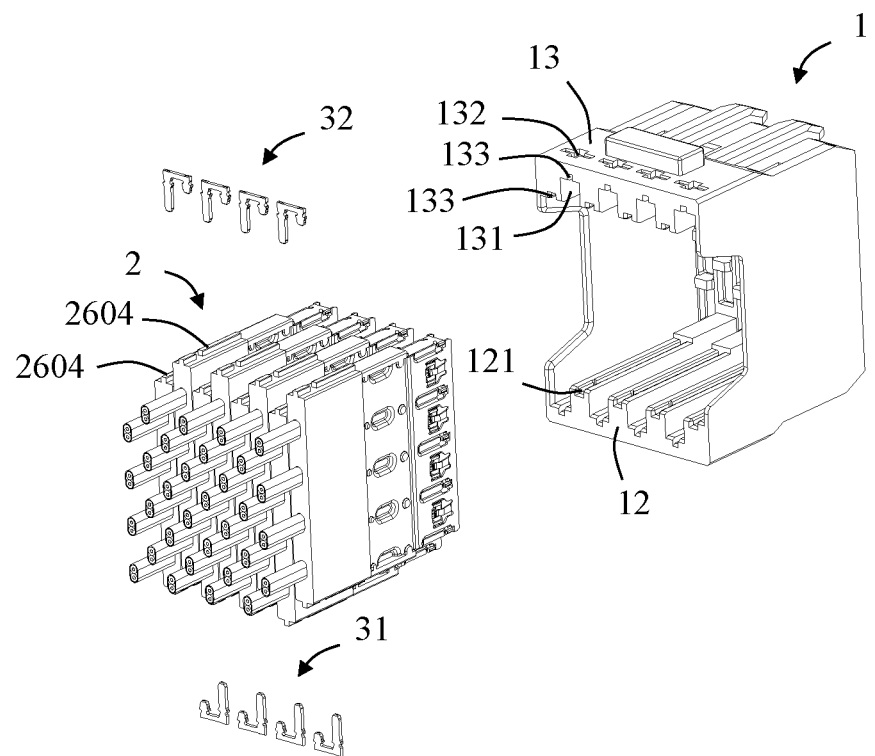
FIG. 6 is a partially exploded perspective view of FIG. 5 from another angle.

Referring to FIGS. 5 and 6, when the first mating modules 2 are assembled to the first housing 1 along a rear-to-front direction, the first convex ribs 2603 of the first mating modules 2 are positioned in the corresponding first positioning slots 123, and the second convex ribs 2604 of the first mating modules 2 are positioned in the corresponding second positioning slots 133. As a result, positions of the first mating modules 2 in the vertical direction and the left-right direction are restricted. When the first mating modules 2 are assembled in place forwardly, a stop (not shown) provided at a front end of the first housing 1 prevents the first mating modules 2 from continuing to move forward, thereby the first mating modules 2 are prevented from being excessively inserted into the first housing 1. In an embodiment of the present disclosure, the first convex rib 2603 and/or the second convex rib 2604 of two adjacent first mating modules 2 are different in at least one design element among the design elements such as shape, structure and size. This makes the two adjacent first mating modules 2 have a fool-proof design so as to avoid wrong insertion. It can be understood that no matter what is the difference between the first convex rib 2603 and/or the second convex rib 2604 of the two adjacent first mating modules 2 in the design elements such as shape, structure and size, regarding one first mating module 2, the first convex rib 2603 is matched with the corresponding first positioning slot 123, and the second convex rib 2604 is matched with the corresponding second positioning slot 133. In other words, for one first mating module 2, its first convex rib 2603 can be inserted and positioned in the corresponding first positioning slot 123, and its second convex rib 2604 can be inserted and positioned in the corresponding second positioning slot 133. After the plurality of the first mating modules 2 are assembled in place, the first pin pieces 31 and the second pin pieces 32 are respectively inserted into the first housing 1 along the vertical direction. At this time, the first pin piece portion 311 of the first pin piece 31 and the third pin piece portion 321 of the second pin piece 32 are respectively clamped in the first positioning groove 2601 and the second positioning groove 2602. At the same time, the second pin piece portion 312 of the first pin piece 31 and the fourth pin piece portion 322 of the second pin piece 32 are respectively clamped in the first positioning groove 2601 and the second positioning groove 2602 of the other (adjacent) first mating module 2. By using the first pin piece 31 and the second pin piece 32 to fix the first mating modules 2, it is possible to prevent the first mating modules 2 from being separated from the first housing 1 in a direction opposite to an assembling direction. In addition, this design saves space because the first pin piece 31 and the second pin piece 32 can be hidden in the first housing 1. As a result, this reduces the size of the first electrical connector 100 to a certain extent, and can reduce the probability that the first pin piece 31 and the second pin piece 32 will lose their limiting effect due to improper force from the outside.

In the illustrated embodiment of the present disclosure, multiple first mating modules 2 of the first electrical connector 100 are provided. The terminal arrangement of the two adjacent first mating modules 2 is staggered. Correspondingly, the shielding cavities 26 at the same position of the two adjacent first mating modules 2 are staggered (referring to FIG. 29). The shielding spaces 27 at the same position of the two adjacent first mating modules 2 are staggered (referring to FIG. 31).

Figure 34:
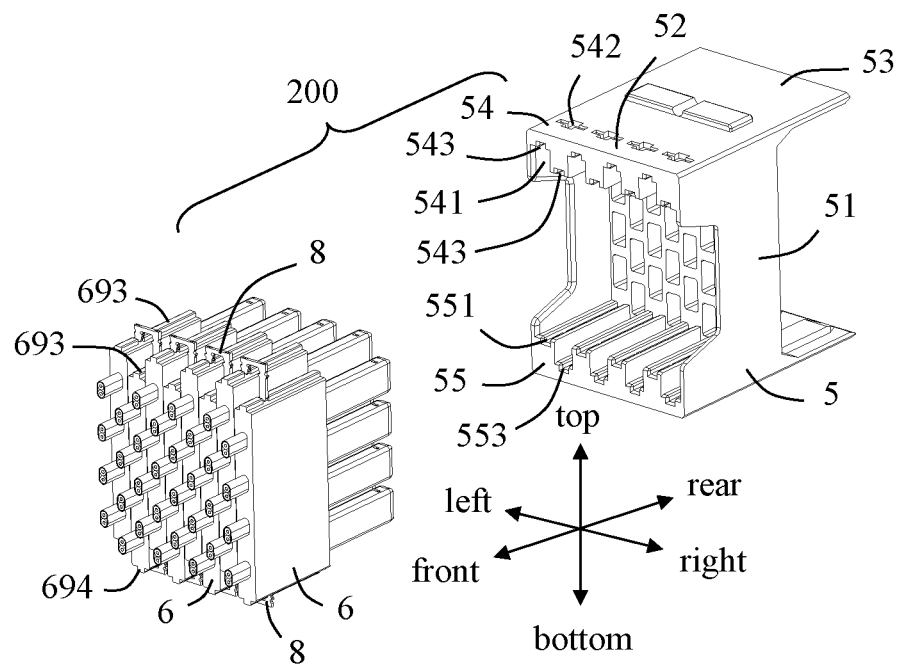
FIG. 34 is a partial perspective exploded view of the second electrical connector in FIG. 2, in which a second housing is separated.
Figure 35:
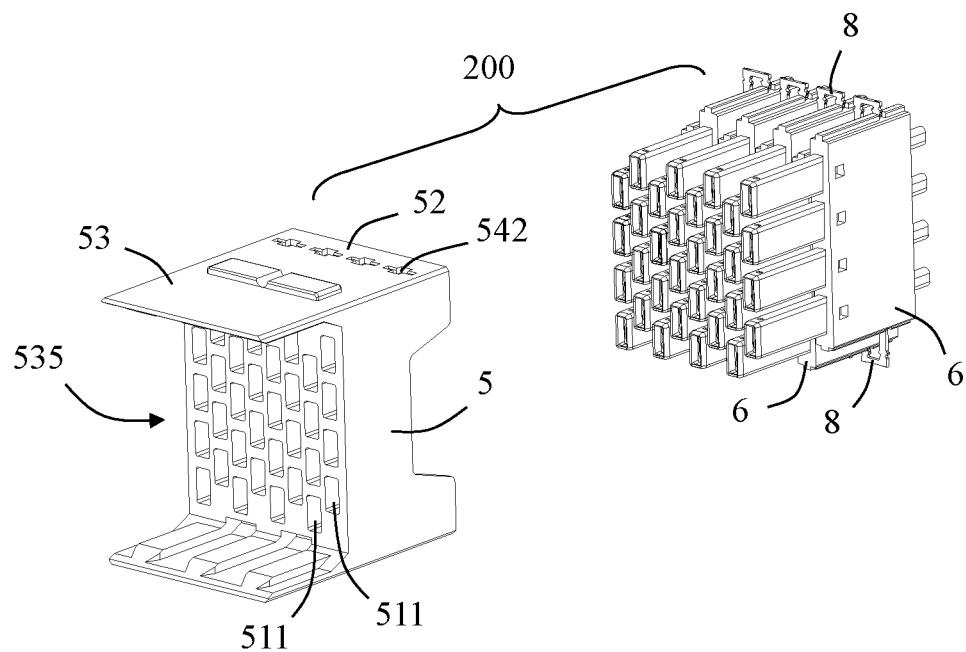
FIG. 35 is a partially exploded perspective view of FIG. 34 from another angle.
Figure 36:
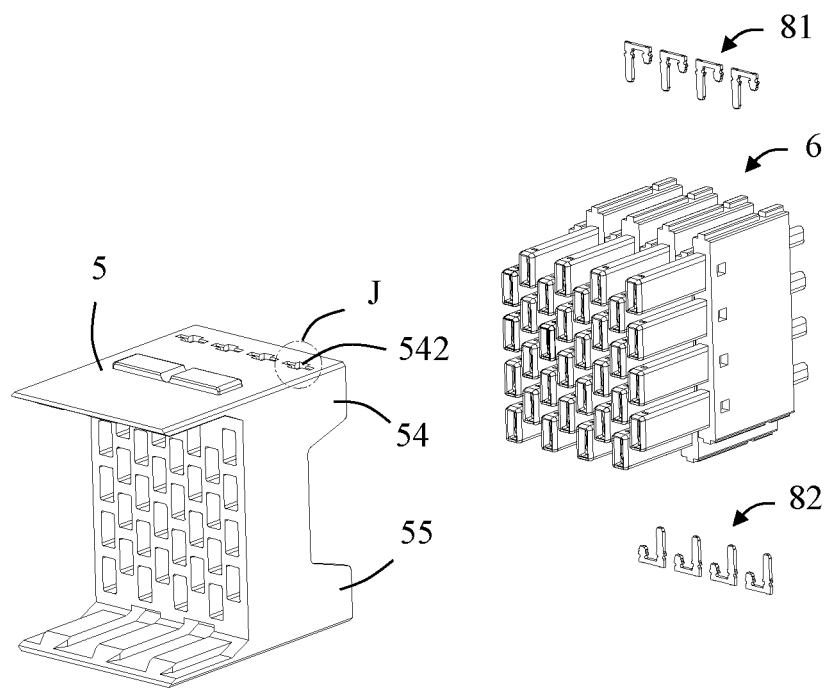
FIG. 36 is a further perspective exploded view of FIG. 35, in which a plurality of second positioning pieces are separated.
Figure 37:
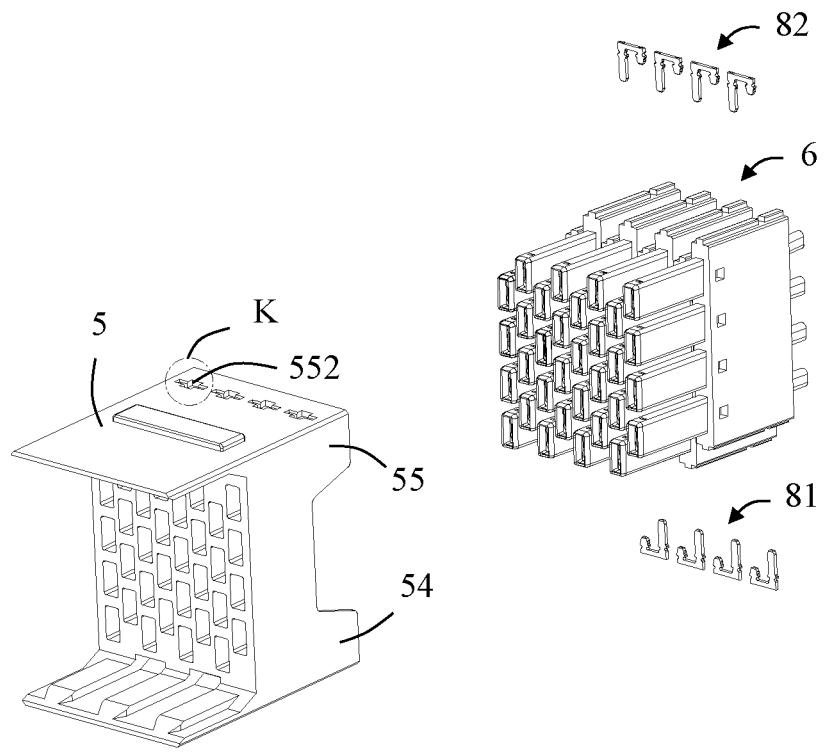
FIG. 37 is a partially exploded perspective view of FIG. 36 from another angle.

Referring to FIGS. 34 and 35, the second electrical connector 200 includes a second housing 5, a plurality of second mating modules 6 mounted to the second housing 5, and a plurality of second positioning pieces 8 for positioning the second mating modules 6 in the second housing 5.

The second housing 5 is made of insulating material, and includes a second body portion 51, a first extension wall 52 extending from the second body portion 51 to one end, and a second extension wall 53 extending from the second body portion 51 to the other end. The second body portion 51 includes a plurality of second terminal receiving grooves 511 extending along a front-rear direction. In the illustrated embodiment of the present disclosure, the second terminal receiving grooves 511 are disposed in multiple rows along a left-right direction. Two adjacent rows of second terminal receiving grooves 511 are staggered in a vertical direction. That is, the second terminal receiving grooves 511 at corresponding positions in the two adjacent rows of second terminal receiving grooves 511 are not aligned in the left-right direction. The first extension wall 52 includes a first extension wall portion 54 and a second extension wall portion 55 opposite to each other. The second extension wall 53 includes a receiving space 535 which is used for at least partially receiving the first electrical connector 100. The first extension wall portion 54 includes a plurality of third slots 541, a plurality of third locking slots 542 communicating with the third slots 541, and a plurality of third positioning slots 543 for positioning the corresponding second mating modules 6. The second extension wall portion 55 includes a plurality of fourth slots 551, a plurality of fourth locking slots 552 communicating with the fourth slots 551, and a plurality of fourth positioning slots 553 for positioning the corresponding second mating modules 6. The third slots 541 and the fourth slots 551 extend in the front-rear direction. The third slot 541 and the fourth slot 551 which are aligned with each other in the vertical direction are used for receiving one second mating module 6. The third locking slots 542 and the fourth locking slots 552 extend along the vertical direction. The third locking slots 542 extend through the first extension wall portion 54 along the vertical direction so as to communicate with the corresponding third slots 541. The fourth locking slots 552 extend through the second extension wall portion 55 along the vertical direction so as to communicate with the corresponding fourth slots 551.

Figure 38:
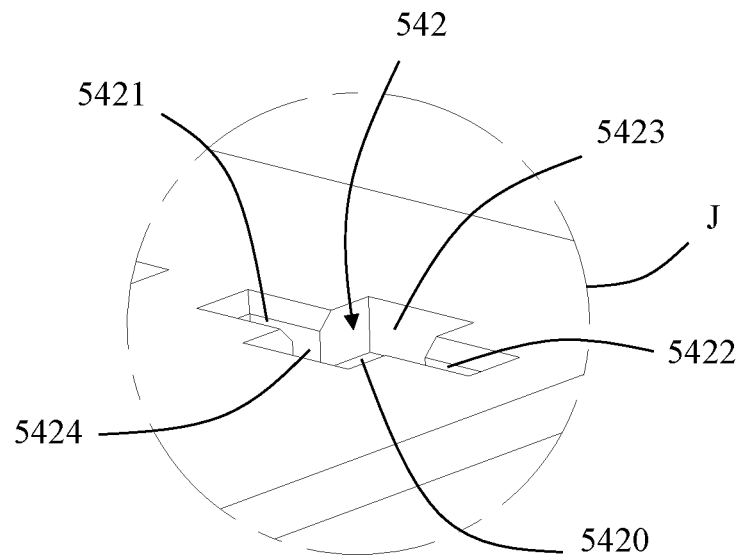
FIG. 38 is a partial enlarged view of a circled portion J in FIG. 36.

Referring to FIG. 38, in the illustrated embodiment of the present disclosure, each third locking slot 542 is approximately cross-shaped, and includes a third intermediate slot portion 5420, a fifth slot portion 5421 located on one side (i.e., a left side) of the third intermediate slot portion 5420 along a first direction (i.e., the left-right direction), a sixth slot portion 5422 located on the other side (i.e., a right side) of the third intermediate slot portion 5420 along the first direction, a fifth slotted portion 5423 located on one side (i.e., a front side) of the third intermediate slot portion 5420 along a second direction (i.e., the front-rear direction), and a sixth slotted portion 5424 located on the other side (i.e., the rear side) of the third intermediate slot portion 5420 along the second direction. Regarding one third locking slot 542 itself, the fifth slot portion 5421, the third intermediate slot portion 5420 and the sixth slot portion 5422 are communicated in the left-right direction. The fifth slotted portion 5423, the third intermediate slot portion 5420 and the sixth slotted portion 5424 are communicated in the front-rear direction. The fifth slot portion 5421 and the sixth slot portion 5422 both extend through the first extension wall portion 54 along the vertical direction so as to communicate with the corresponding third slots 541. The third intermediate slot portion 5420 does not extend downwardly through the first extension wall portion 54 so that a surface of the first extension wall portion 54 located inside the third intermediate slot portion 5420 can limit the corresponding second positioning piece 8. In addition, in the present disclosure, by providing the fifth slotted portion 5423 and the sixth slotted portion 5424, it is advantageous to clamp the second positioning piece 8 by a clamp, and to assemble or disassemble the second positioning piece 8 in the third locking slot 542.

Figure 39:
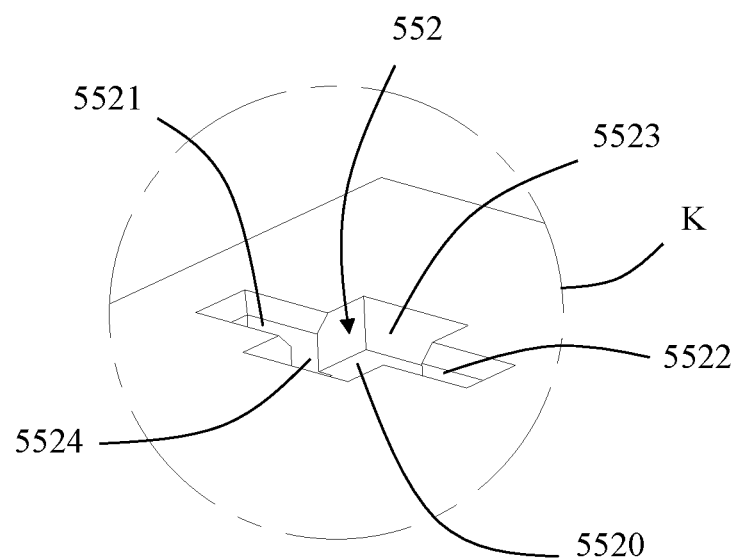
FIG. 39 is a partial enlarged view of a circled portion K in FIG. 36.

Similarly, referring to FIG. 39, each fourth locking slot 552 is roughly cross-shaped, and includes a fourth intermediate slot portion 5520, a seventh slot portion 5521 located on one side (i.e., the left side) of the fourth intermediate slot portion 5520 along the first direction (i.e., the left-right direction), an eighth slot portion 5522 located on the other side (i.e., the right side) of the fourth intermediate slot portion 5520 along the first direction, a seventh slotted portion 5523 located on one side (i.e., the front side) of the fourth intermediate slot portion 5520 along the second direction (i.e., the front-rear direction), and an eighth slotted portion 5524 located on the other side (i.e., the rear side) of the fourth intermediate slot portion 5520 along the second direction. Regarding one fourth locking slot 552 itself, the seventh slot 5521, the fourth intermediate slot 5520 and the eighth slot 5522 are communicated in the left-right direction. The seventh slotted portion 5523, the fourth intermediate slot portion 5520 and the eighth slotted portion 5524 are communicated along the front-rear direction. The eighth slot portion 5522 extends through the second extension wall portion 55 in the vertical direction so as to communicate with the fourth slot 551. The seventh slot portion 5521 and the fourth slot portion 5422 both extend through the second extension wall portion 55 along the vertical direction so as to communicate with the corresponding fourth slot 551. The fourth intermediate slot portion 5520 does not extend upwardly through the second extension wall portion 55, so that a surface of the second extension wall portion 55 located in the fourth intermediate slot portion 5520 can be used to limit the corresponding second positioning piece 8. In addition, by providing the seventh slot 5523 and the eighth slot 5524 in the present disclosure, it is advantageous to clamp the second positioning piece 8 by a clamp, and to assemble or disassemble the second positioning piece 8 in the fourth locking slot 552.

Figure 52:
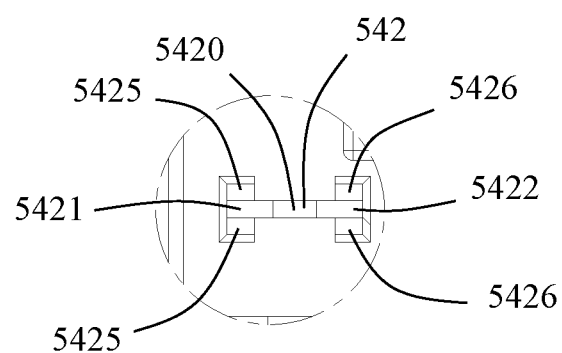
FIG. 52 is a top view of a third locking slot in FIG. 38 in another embodiment.

In the illustrated embodiment of the present disclosure, the third locking slot 542 and the fourth locking slot 552 are substantially cross-shaped. Of course, in other embodiments, the third locking slot 542 may also be H-shaped. Specifically, referring to FIG. 52, the third locking slot 542 includes a third intermediate slot portion 5420, a fifth slot portion 5421 located on one side (i.e., the left side) of the third intermediate slot portion 5420 along the first direction (i.e., the left-right direction), a sixth slot portion 5422 located on the other side (i.e., the right side) of the third intermediate slot portion 5420 along the first direction, fifth opening portions 5425 located on both sides of the fifth slot portion 5421 along the second direction (i.e., the front-rear direction), and sixth opening portions 5426 located on both sides of the sixth slot portion 5422 along the second direction. Regarding one third locking slot 542 itself, the fifth slot portion 5421, the third intermediate slot portion 5420 and the sixth slot portion 5422 are communicated in the left-right direction. The third intermediate slot portion 5420 does not extend downwardly through the first extension wall portion 54 so that a surface of the first extension wall portion 54 located in the third intermediate slot portion 5420 can be used to limit the corresponding second positioning piece 8. In addition, in the present disclosure, by providing the fifth opening 5425 and the sixth opening 5426, it is advantageous to clamp the second positioning piece 8 by a clamp, and to assemble or disassemble the second positioning piece 8 in the third locking slot 542. The shape of the fourth locking slot 552 may be the same as the shape of the third locking slot 542, that is, the fourth locking slot 552 is also H-shaped, which will not be repeated in the present disclosure. Of course, in other embodiments, the third locking slot 542 and the fourth locking slot 552 may also have other shapes which are not limited by the present disclosure.

Figure 40:
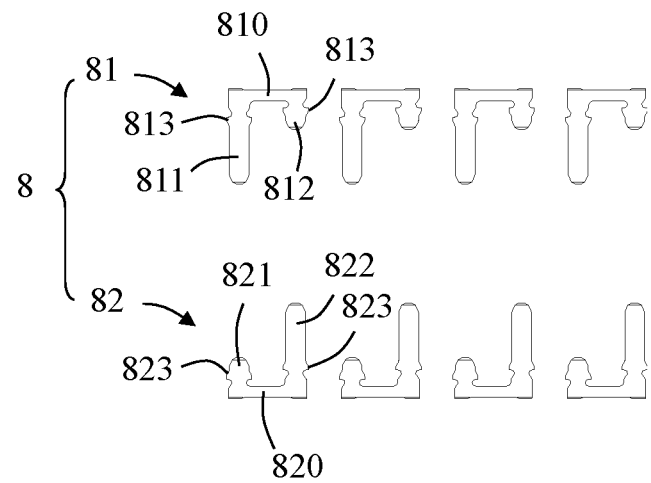
FIG. 40 is a front view of the second positioning pieces in accordance with an embodiment of the present disclosure.

Referring to FIG. 40, the second positioning piece 8 includes a plurality of third pin pieces 81 mating with the third locking slots 542 and a plurality of fourth pin pieces 82 mating with the fourth locking slots 552. Each third pin piece 81 is approximately in the shape of an inverted U, and includes a fifth pin piece portion 811 fixed in the fifth slot portion 5421, a sixth pin piece portion 812 fixed in the sixth slot portion 5422, and a third connecting portion 810 connecting the fifth pin piece portion 811 and the sixth pin piece portion 812. In the illustrated embodiment of the present disclosure, the fifth pin piece portion 811 and the sixth pin piece portion 812 respectively include a plurality of third barbs 813 in order to improve the holding force with the first extension wall portion 54. The third connecting portion 810 is received in the third intermediate slot portion 5420. In the illustrated embodiment of the present disclosure, lengths of the fifth pin piece portion 811 and the sixth pin piece portion 812 are different in order to correspond to different second mating modules 6.

Similarly, each fourth pin piece 82 is substantially U-shaped, and includes a seventh pin piece portion 821 fixed in the seventh slot portion 5521, an eighth pin piece portion 822 fixed in the eighth slot portion 5522, and a fourth connecting portion 820 connecting the seventh pin piece portion 821 and the eighth pin piece portion 822. In the illustrated embodiment of the present disclosure, the seventh pin piece portion 821 and the eighth pin piece portion 822 respectively include a plurality of fourth barbs 823 in order to improve the holding force with the second extension wall portion 55. The fourth connecting portion 820 is received in the fourth intermediate slot portion 5520. In the illustrated embodiment of the present disclosure, the seventh pin piece portion 821 and the eighth pin piece portion 822 have different lengths in order to correspond to different second mating modules 6.

Figure 41:
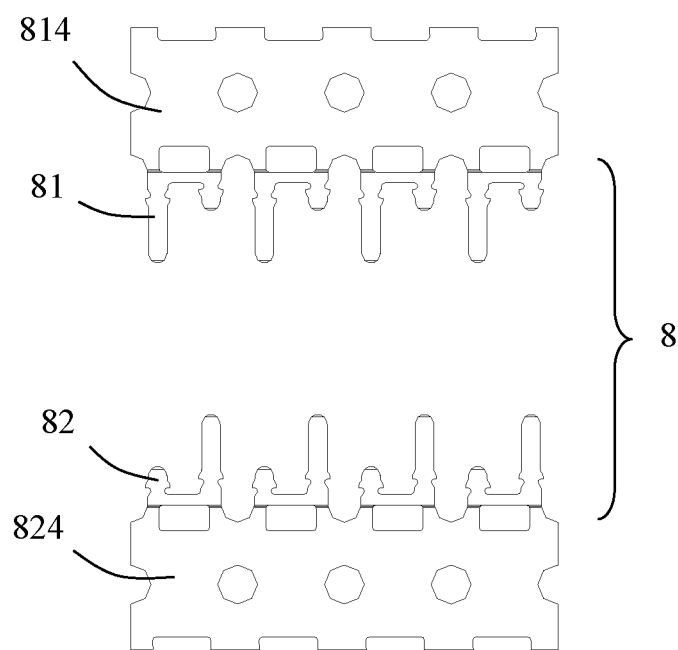
FIG. 41 is a front view of the second positioning pieces in accordance with another embodiment of the present disclosure.
Figure 42:
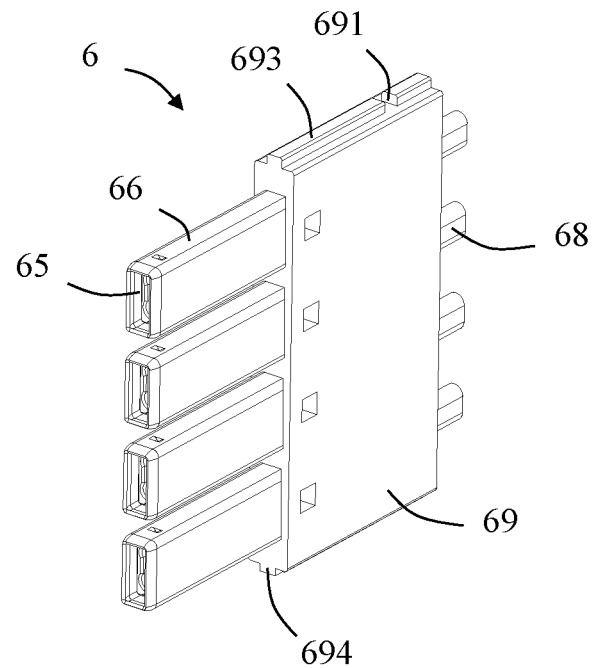
FIG. 42 is a perspective schematic view of a second mating module.

In an embodiment of the present disclosure, the third pin piece 81 and the fourth pin piece 82 are both stamped from a metal sheet. The plurality of third pin pieces 81 can be separately provided, and are separately installed in the corresponding third locking slots 542, respectively. The plurality of fourth pin pieces 82 can be separately provided, and are separately installed in the corresponding fourth locking slots 552, respectively. Of course, in other embodiments, referring to FIG. 41, the plurality of third pin pieces 81 may also be connected as a whole by a third strip 814. The plurality of fourth pin pieces 82 can also be connected as a whole by a fourth strip 824. During assembling, the third pin piece 81 and the fourth pin piece 82 are integrally installed in the corresponding third locking slots 542 and the fourth locking slots 552, respectively, so as to improve the installation efficiency. After the assembly is completed, the third strip 814 and the fourth strip 824 can be removed or retained according to actual needs.

Referring to FIGS. 42 to 48, each second mating module 6 includes a plurality of insulating blocks 65, a plurality of second terminal modules 60 mounted to the insulating blocks 65, a plurality of metal shield surrounding members 66 sleeved on the insulating blocks 65 and the second terminal modules 60, a metal shielding plate 67 for mating with the metal shield surrounding members 66, a plurality of second cables 68 electrically connected to the second terminal modules 60, and a second outer covering portion 69 partially covering the second terminal modules 60, the metal shield surrounding members 66, the metal shielding plate 67 and the second cables 68.

Figure 48:
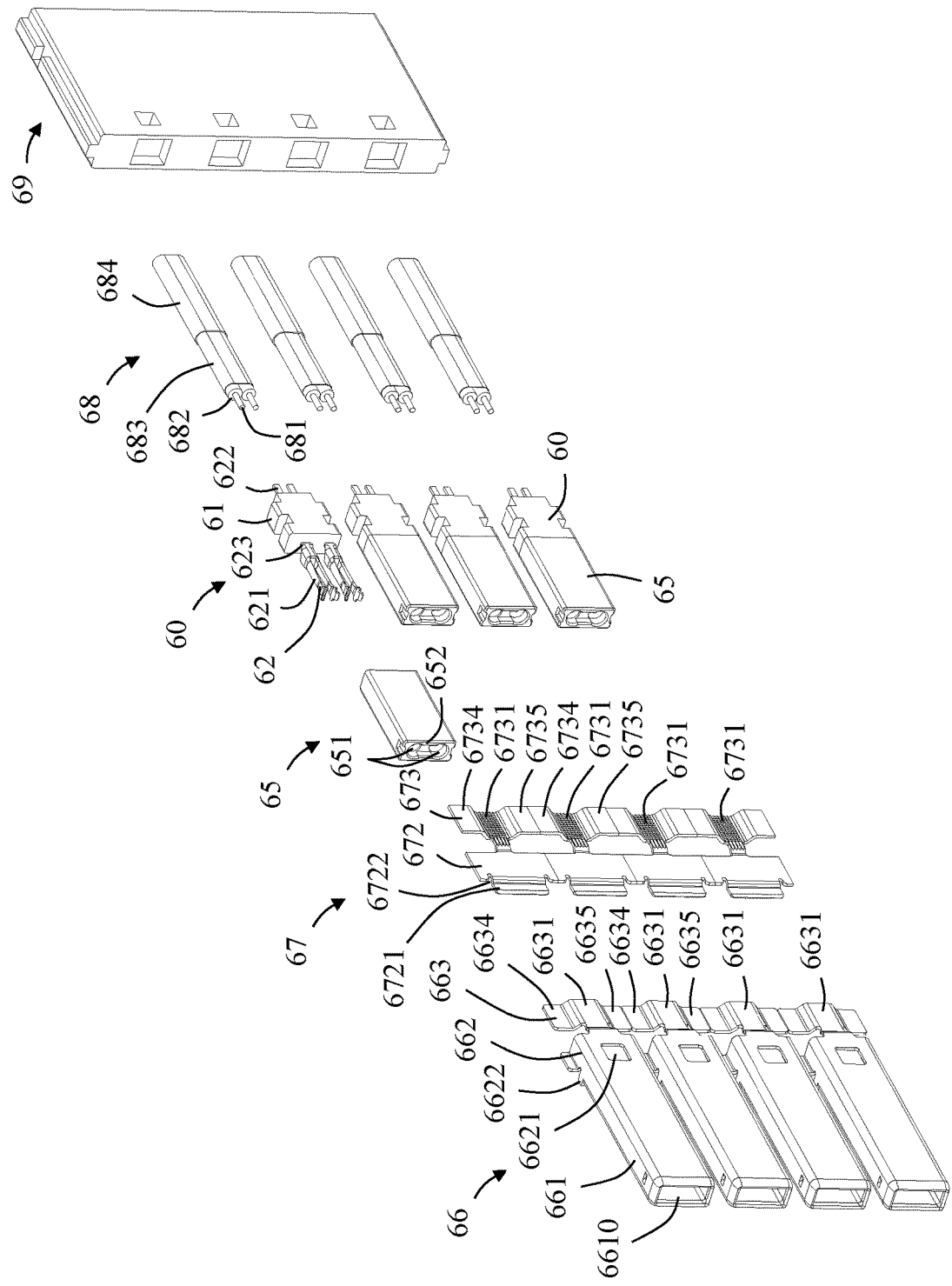
FIG. 48 is a further perspective exploded view of FIG. 46.

Referring to FIG. 48, each second terminal module 60 includes an insulating member 61 and a plurality of second conductive terminals 62 fixed to the insulating member 61. In an embodiment of the present disclosure, the second conductive terminals 62 are insert-molded with the insulating member 61. Of course, in other embodiments, the second conductive terminals 62 may also be fixed to the insulating member 61 by assembling or the like.

Each group of second conductive terminals 62 include a second contact arm 621, a second tail portion 622, and a second connection portion 623 connecting the second contact arm 621 and the second tail portion 622. The second connection portions 623 of the second conductive terminals 62 are fixed to the insulating member 61. The second contact arm 621 extends forwardly and protrudes beyond the insulating member 61 for being electrically connected with the first electrical connector 100. The second tail portion 622 extends backwardly and protrudes beyond the insulating member 61 for being electrically connected to the second cable 68. In the illustrated embodiment of the present disclosure, the second conductive terminal 62 is substantially straight and extends in the front-rear direction.

In an embodiment of the present disclosure, the second conductive terminals 62 of each second terminal module 60 form a pair of second differential signal terminals in order to increase the signal transmission rate.

Each of the insulating blocks 65 includes a mating surface 652 at an end and two through holes 651 into which the second contact arms 621 of the second conductive terminals 62 are inserted. The through holes 651 extend through the mating surface 652. In the illustrated embodiment of the present disclosure, the insulating block 65 has a substantial cuboid configuration. Correspondingly, the metal shield surrounding member 66 is of a substantial cuboid configuration. In an embodiment of the present disclosure, the insulating block 65 is fixed in the metal shield surrounding member 66 by assembling or other ways.

Referring to FIG. 48, the metal shield surrounding member 66 includes a hollow portion 661, a first extended portion 662 connected to the hollow portion 661, and a third extension tail 663 connected to the first extended portion 662. The hollow portion 661 includes a shielding chamber 6610 for accommodating the insulating block 65 and the second terminal module 60 so as to improve the shielding effect. A cross-section of the first extended portion 662 is approximately U-shaped. The first extended portion 662 includes an opening 6621 corresponding to the second tail portion 622 and a positioning protrusion 6622 protruding toward the metal shielding plate 67.

The third extension tail 663 includes a plurality of third abutting portions 6631 facing a direction toward the metal shielding plate 67. Each third abutting portion 6631 further includes a plurality of third protrusions. In the illustrated embodiment of the present disclosure, the third protrusions are saw teeth each of which includes a substantially pyramid-shaped tip portion (referring to the saw teeth as shown in FIGS. 26 and 27).

In an embodiment of the present disclosure, the third extension tail 663 further includes a plurality of fifth bridge portions 6634 and a plurality of sixth bridge portions 6335 extending from upper and lower sides of the third abutting portions 6631, respectively. The adjacent fifth bridge portion 6634 and sixth bridge portion 6335 are connected together. By providing the fifth bridge portions 6634 and the sixth bridge portions 6335, on the one hand, the grounding area of the third extension tail 663 is increased, thus the shielding effect is improved; on the other hand, the third extension tail 663 can be connected as a whole along the vertical direction, thereby improving the structural strength.

The metal shielding plate 67 includes a second extended portion 672 and a fourth extension tail 673 connected to the second extended portion 672. The second extended portion 672 is disposed opposite to the first extended portion 662. The fourth extension tail 673 and the third extension tail 663 are disposed opposite to each other. In other words, at a location where the second tail portion 622 of the second conductive terminal 62 is connected to the second cable 68, the metal shielding plate 67, and the first extended portion 662 and the third extension tail 663 of the metal shield surrounding member 66 are located on two sides, respectively, and are used to clamp the second cable 68.

Specifically, in the illustrated embodiment of the present disclosure, the second extended portion 672 includes an end portion 6721 contacting the hollow portion 661 and a positioning notch 6722 for mating with the positioning protrusion 6622. Through the cooperation of the positioning protrusion 6622 and the positioning notch 6722, the assembly and positioning of the metal shield surrounding member 66 and the metal shielding plate 67 can be realized in a front-rear assembly direction. The second extended portion 672 is in contact with the first extended portion 662 so as to improve the shielding effect.

Figure 45:
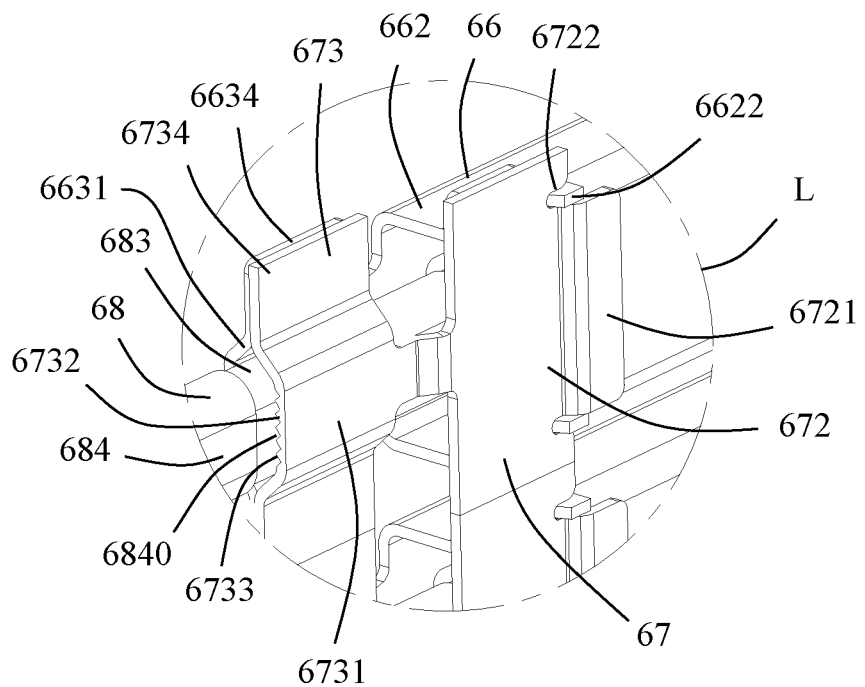
FIG. 45 is a partial enlarged view of a circled portion L in FIG. 44.
Figure 46:
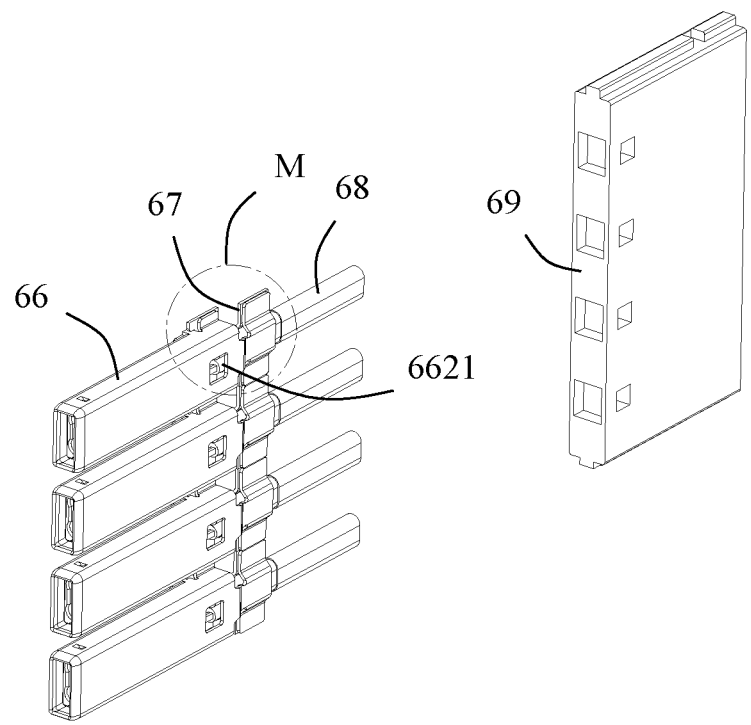
FIG. 46 is a partial perspective exploded view of the second mating module in FIG. 42.

Referring to FIG. 45, the fourth extension tail 673 includes a plurality of fourth abutting portions 6731 facing a direction toward the third abutting portion 6631. Each fourth abutting portion 6731 further includes a plurality of fourth protrusions 6732. In the illustrated embodiment of the present disclosure, the fourth protrusions 6732 are saw teeth each of which includes a substantially pyramid-shaped tip portion 6733. In an embodiment of the present disclosure, the third protrusions and the fourth protrusions 6732 have similar structures. The third protrusions are disposed on a side wall of the third abutting portion 6631 adjacent to the fourth abutting portion 6731. That is, the third protrusions are provided on a side wall of the third abutting portion 6631 facing the corresponding second cable 68.

In an embodiment of the present disclosure, the fourth extension tail 673 further includes a plurality of seventh bridge portions 6734 and a plurality of eighth bridge portions 6735 extending from upper and lower sides of the fourth abutting portions 6731, respectively. The adjacent seventh bridge portion 6734 and the eighth bridge portion 6735 are connected together. By providing the seventh bridge portions 6734 and the eighth bridge portions 6735, on the one hand, the grounding area of the fourth extension tail 673 is increased, thus the shielding effect is improved; on the other hand, the fourth extension tail 673 can be connected as a whole along the vertical direction, thereby improving the structural strength. In the illustrated embodiment of the present disclosure, the seventh bridge portions 6734 are in contact with the fifth bridge portions 6634, and the eighth bridge portions 6735 are in contact with the sixth bridge portions 6335 so as to improve the shielding effect.

Figure 49:
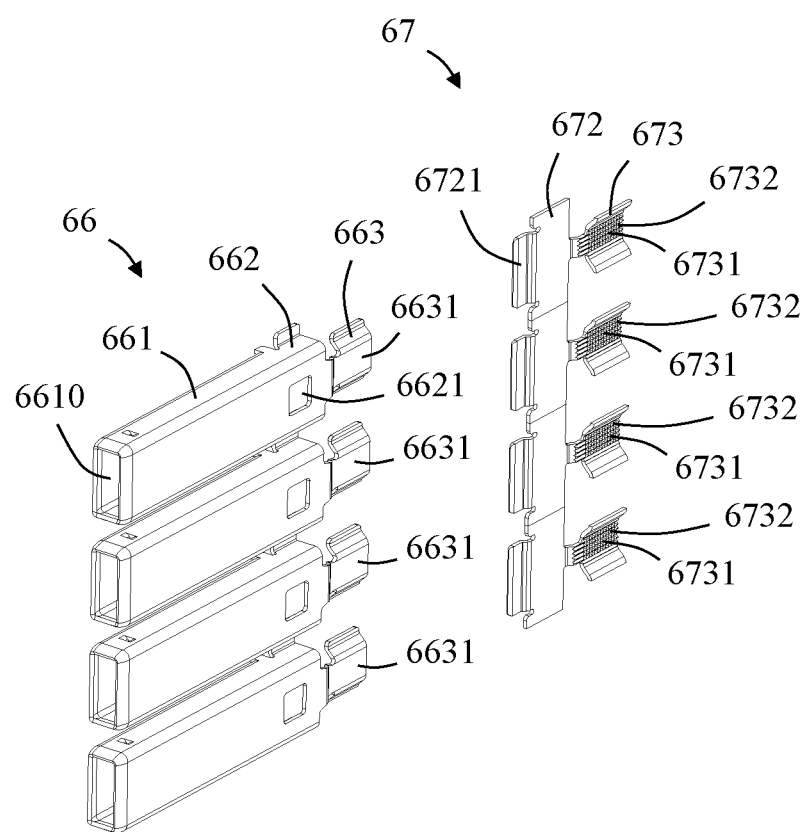
FIG. 49 is a perspective schematic view of a metal shield surrounding member and the metal shielding plate in another embodiment in FIG. 48.

Referring to FIG. 49, in another embodiment of the metal shield surrounding member 66 and the metal shielding plate 67, the plurality of third abutting portions 6631 are spaced apart from each other in the vertical direction, and the plurality of fourth abutting portions 6731 are spaced apart from each other in the vertical direction.

Figure 43:
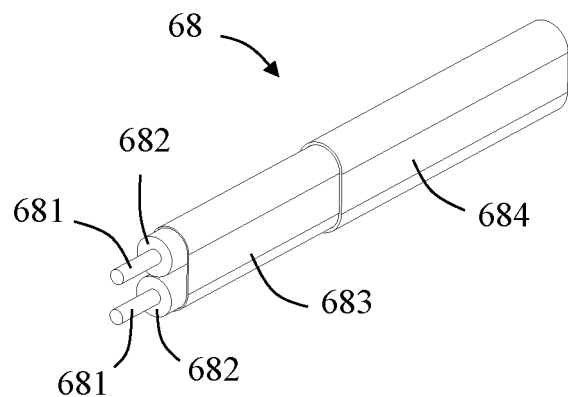
FIG. 43 is a perspective schematic view of FIG. 42 from another angle.

Referring to FIGS. 43 and 48, each second cable 68 includes second cores 681 for electrically connecting with the second tail portions 622 of the second differential signal terminals, second insulating layers 682 wrapped on the second cores 681, a second shielding layer 683 wrapped on the second insulating layers 682, and a second insulating outer layer 684 wrapped on a part of the second shielding layer 683. In an embodiment of the present disclosure, the second cores 681 are fixed to the second tail portions 622 of the second differential signal terminals by soldering. In the illustrated embodiment of the present disclosure, for each second cable 68 per se, the second shielding layer 683 is partially exposed to the second insulating outer layer 684 in order to be in contact with the third extension tail 663 and the fourth extension tail 673.

Figure 47:
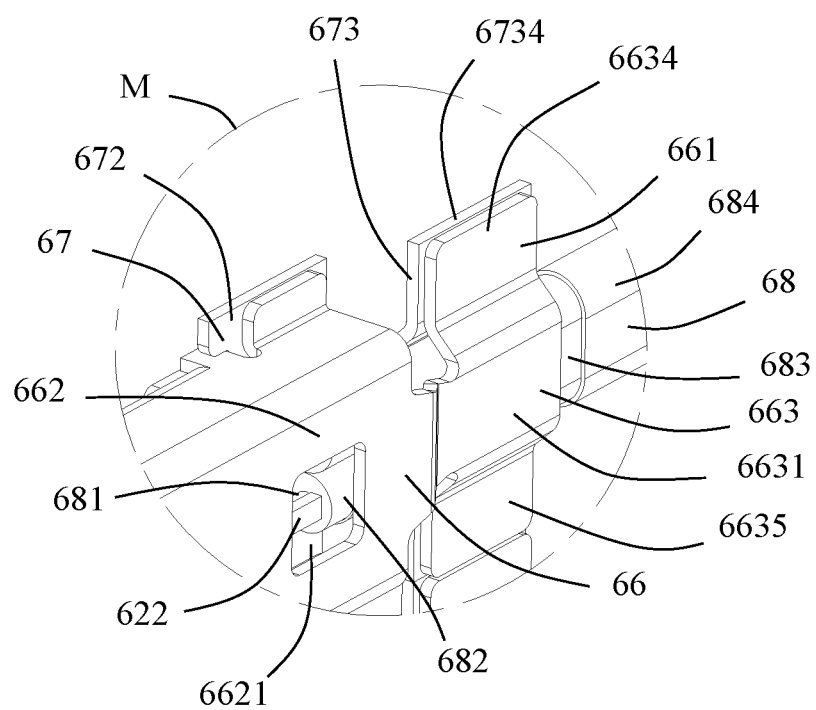
FIG. 47 is a partial enlarged view of a circled portion M in FIG. 46.

Referring to FIGS. 45 and 47, in the illustrated embodiment of the present disclosure, the third abutting portion 6631 of the third extension tail 663 and the fourth abutting portion 6731 of the fourth extension tail 673 jointly clamp the corresponding the second shielding layer 683 of the second cable 68. The saw teeth of the third abutting portions 6631 and the saw teeth of the fourth abutting portions 6731 abut against the second shielding layer 683 of the second cable 68, so as to improve the holding force with the second shielding layer 683. Through such design, on the one hand, it can better improve the contact reliability, and on the other hand, it is beneficial to prevent the second cable 68 from loosening. Further, the saw teeth of the third abutting portions 6631 and the saw teeth of the fourth abutting portions 6731 pierce the corresponding second shielding layer 683 of the second cable 68, thereby further improving the holding force. In the illustrated embodiment of the present disclosure, when the saw teeth of the third abutting portions 6631 and the saw teeth of the fourth abutting portions 6731 abut against or pierce the corresponding second shielding layer 683 of the second cable 68, gaps 6840 between adjacent saw teeth (referring to FIG. 45) can facilitate the injection of conductive slurry into the gaps 6840, thereby further improving the electrical connection effect of the third extension tail 663, the fourth extension tail 673 and the second shielding layer 683, and further improving contact reliability and holding force.

In addition, when the third abutting portions 6631 and the fourth abutting portions 6731 are spaced apart from each other in the vertical direction, in order to increase the clamping force of the third abutting portions 6631 of the third extension tail 663 and the fourth abutting portion 6731 of the fourth extension tail 673, which jointly clamp the corresponding the second shielding layer 683 of the second cable 68, the second insulating outer layer 684 further includes a plurality of heat-shrinkable sleeves (not shown) sleeved on the third abutting portions 6631 and the fourth abutting portions 6731 which are aligned along the left-right direction. By providing the heat-shrinkable sleeves, it is beneficial to form a long-term clamping force and improve the durability of products.

Before forming the second outer covering portion 69, soldering portions of the second cores 681 and the second tail portions 622 of the second differential signal terminals are exposed in the corresponding openings 6621, so that the soldering portions and/or components surrounding the soldering portions can be protected by using a fixture. Then, the second outer covering portion 69 is fixed to the second terminal modules 60, the metal shield surrounding members 66, the metal shielding plate 67 and the second cables 68 by over-molding, thereby improving the integrity of the second mating module 6 and improving the assembly efficiency.

Figure 44:
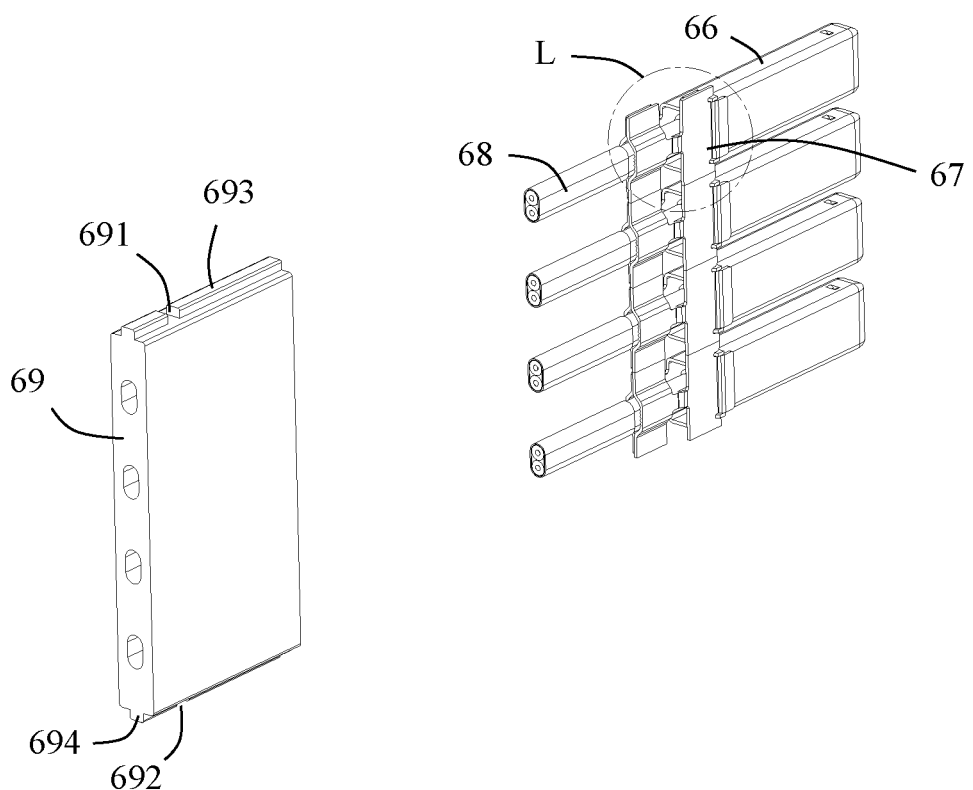
FIG. 44 is a partial perspective exploded view of the second mating module.

Referring to FIG. 44, the second outer covering portion 69 is made of insulating material, and includes a third positioning groove 691 on a top surface thereof and a fourth positioning groove 692 on a bottom surface thereof. In the illustrated embodiment of the present disclosure, the second outer covering portion 69 includes a third convex rib 693 located on a top surface thereof and a fourth convex rib 694 located on a bottom surface thereof. The third positioning groove 691 is formed on the third convex rib 693. The fourth positioning groove 692 is formed on the fourth convex rib 694. Referring to FIG. 34, when the second mating modules 6 are assembled to the second housing 5 along a rear-to-front direction, the third convex rib 693 of the second mating module 6 is positioned in the corresponding third positioning groove 543, and the fourth convex rib 694 of the second mating module 6 is positioned in the corresponding fourth positioning groove 553, thereby positions of the second mating modules 6 along the vertical direction and the left-right direction are restricted. When the second mating modules 6 are assembled in place backwards, a stop (not shown) provided at a rear end of the second housing 5 prevents the second mating modules 6 from continuing to move backwards, thereby the second mating modules 6 are prevented from being excessively inserted into the second housing 5. In an embodiment of the present disclosure, the third convex rib 693 and/or the fourth convex rib 694 of the two adjacent second mating modules 6 are different in at least one design element among the design elements such as shape, structure and size. Therefore, the two adjacent second mating modules 6 have a fool-proof design so as to avoid wrong insertion. It can be understood that no matter what is the difference between the third convex rib 693 and/or the fourth convex rib 694 of the two adjacent second mating modules 6 in the design elements such as shape, structure and size, regarding one second mating module 6, the third convex rib 693 is matched with the corresponding third positioning groove 543, and the fourth convex rib 694 is matched with the corresponding fourth positioning groove 553. In other words, regarding one second mating module 6, the third convex rib 693 can be inserted and positioned in the corresponding third positioning groove 543, and the fourth convex rib 694 can be inserted and positioned in the corresponding fourth positioning groove 553. After the plurality of the second mating modules 6 are assembled in place, the third pin piece 81 and the fourth pin piece 82 are respectively inserted into the second housing 5 along the vertical direction. At this time, the fifth pin piece portion 811 of the third pin piece 81 and the seventh pin piece portion 821 of the fourth pin piece 82 are respectively clamped in the third positioning groove 691 and the fourth positioning groove 692 of one second mating module 6. At the same time, the sixth pin piece portion 812 of the third pin piece 81 and the eighth pin piece portion 822 of the fourth pin piece 82 are respectively clamped in the third positioning groove 691 and the fourth positioning groove 692 of the other (adjacent) second mating module 6. By using the third pin piece 81 and the fourth pin piece 82 to fix the second mating modules 6, it is possible to prevent the second mating modules 6 from being separated from the second housing 5 in the direction opposite to an assembling direction. In addition, this design saves space because the third pin piece 81 and the fourth pin piece 82 can be hidden in the second housing 5. This reduces the size of the second electrical connector 200 to a certain extent, and can reduce the probability that the third pin piece 81 and the fourth pin piece 82 will lose their limiting effect due to improper force from the outside.

In the illustrated embodiment of the present disclosure, multiple second mating modules 6 of the electrical connector 200 are provided, in which the arrangement of two adjacent second mating modules 6 is staggered. When the second mating modules 6 are mounted to the second housing 5, the metal shield surrounding members 66 of the second mating modules 6 pass through corresponding terminal receiving grooves so as to extend into the receiving space 535.

Figure 50:
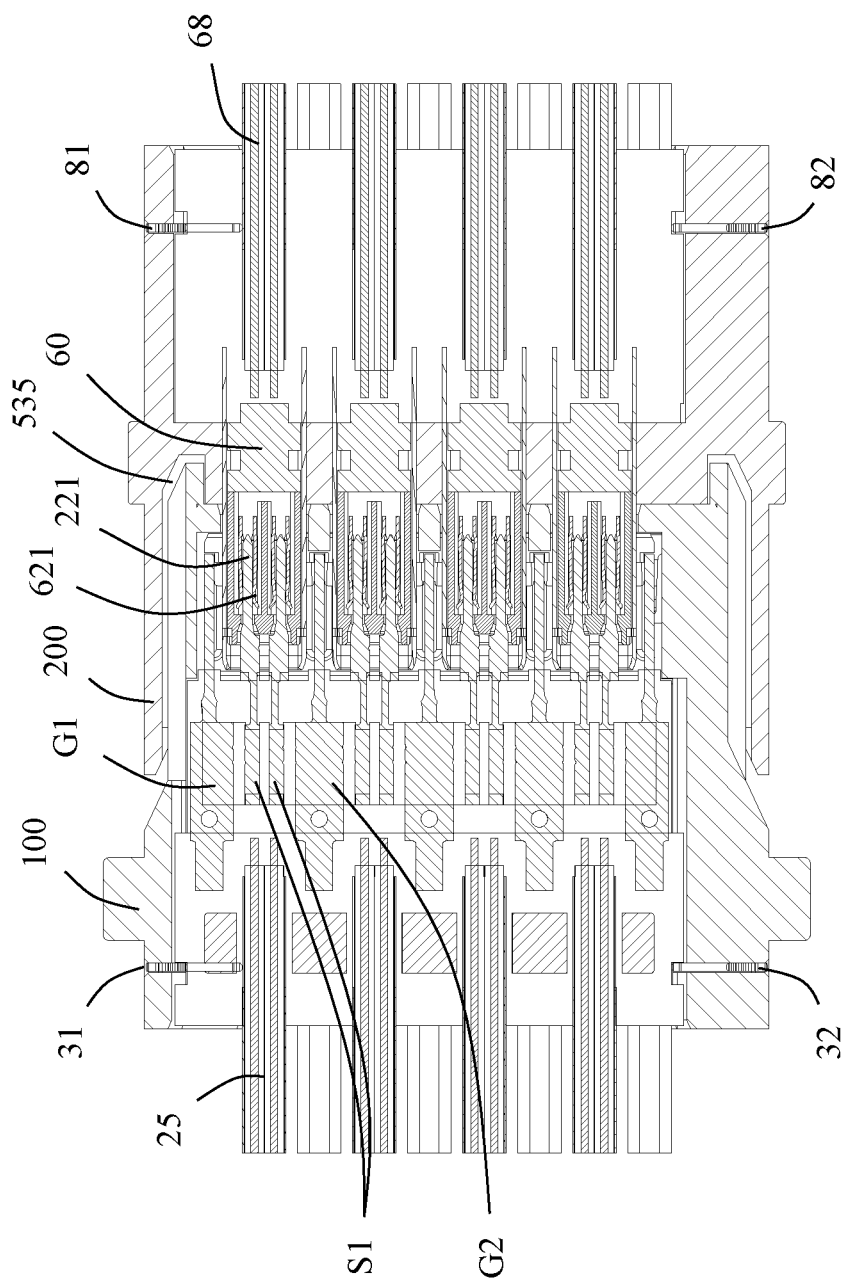
FIG. 50 is a schematic cross-sectional view taken along line A-A in FIG. 1.

Referring to FIG. 50, when the first electrical connector 100 is mated with the second electrical connector 200, the first housing 1 of the first electrical connector 100 is inserted into the receiving space 535 of the second housing 5 of the second electrical connector 200. The first mating portions 221 of the first mating modules 2 are inserted into the second contact arms 621 of the second mating modules 6 so as to achieve contact.

It should be noted that, in order to facilitate the understanding of the technical solutions of the present disclosure, the element names beginning with "first", "second", "third" . . . "eighth" in the present disclosure are the naming method adopted only for the purpose of specifically introducing the technical solutions of the present disclosure in conjunction with the illustrated embodiments of the present disclosure. When the names of these elements do not start with "first", "second", "third" . . . "eighth", etc., these element names are superordinate concept of the element names beginning with "first", "second", "third" . . . "eighth" etc. For example, "a mating module" is a superordinate concept of "the first mating module 2" and "the second mating module 6", and so on.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:
   a housing comprising a body portion, a pair of first extension walls extending from one side of the body portion, and a receiving space formed by the body portion and the pair of first extension walls; the body portion defining a plurality of terminal receiving grooves extending through the body portion and communicating with the receiving space; and
   a plurality of mating modules assembled to the housing; each mating module comprising:
   a plurality of conductive terminals extending along a mating direction, each conductive terminal including a tail portion and a mating portion;
   a metal shield surrounding member comprising a plurality of hollow portions surrounding the mating portions; and
   a cable comprising a plurality of cores electrically connected to the tail portions;
   wherein the metal shield surrounding member is inserted through a corresponding terminal receiving groove to reside in the receiving space in a cantilevered manner.

2. The electrical connector according to claim 1, wherein the mating module comprises a positioning groove, the housing comprises a slot portion corresponding to the positioning groove, and the electrical connector comprises a positioning piece which is inserted into the positioning groove and the slot portion along a direction perpendicular to the mating direction.

3. The electrical connector according to claim 1, wherein each mating module comprises:
  a plurality of insulating blocks each of which defines a through hole;
  a plurality of terminal modules assembled to the insulating blocks, each terminal module comprising an insulating member, the conductive terminals being fixed to the insulating member, the mating portion being received in the through hole; and
  a metal shielding plate in contact with the metal shield surrounding member;
  wherein the hollow portions are sleeved on the insulating blocks and the terminal modules.

4. The electrical connector according to claim 3, wherein the cable comprises a shielding layer;
  wherein the metal shield surrounding member comprises a third extension tail, and the third extension tail comprises a third abutting portion;
  wherein the metal shielding plate comprises a fourth extension tail, and the fourth extension tail comprises a fourth abutting portion; and
  the third abutting portion and the fourth abutting portion clamp the shielding layer from both sides.

5. The electrical connector according to claim 4, wherein the third abutting portion comprises a plurality of third protrusions abutting against the shielding layer, and the fourth abutting portion comprises a plurality of fourth protrusions abutting against the shielding layer.

6. The electrical connector according to claim 5, wherein the third protrusions and the fourth protrusions are saw teeth, and each saw tooth comprises a tip portion which pierces the shielding layer.

7. The electrical connector according to claim 4, wherein a plurality of the third abutting portions are provided and disposed at intervals; wherein a plurality of the fourth abutting portions are provided and disposed at intervals; and wherein the cable comprises a plurality of heat-shrinkable sleeves, and each heat-shrinkable sleeve is sleeved on the third abutting portion and the fourth abutting portion which are in alignment with each other in a direction perpendicular to the mating direction.

8. The electrical connector according to claim 4, wherein a plurality of the third abutting portions are provided, the third extension tail comprises a plurality of fifth bridge portions extending from one side of the third abutting portions and a plurality of sixth bridge portions extending from the other side of the third abutting portions, the fifth bridge portion and the sixth bridge portion adjacent with each other are connected together;
  wherein a plurality of the fourth abutting portions are provided, the fourth extension tail comprises a plurality of seventh bridge portions extending from one side of the fourth abutting portions and a plurality of eighth bridge portions extending from the other side of the fourth abutting portions, the seventh bridge portion and the eighth bridge portion adjacent to each other are connected together; and
  wherein the fifth bridge portions are in contact with the seventh bridge portions, and the sixth bridge portions are in contact with the eighth bridge portions.

9. The electrical connector according to claim 4, wherein the metal shield surrounding member comprises a plurality of first extended portions connecting the hollow portions and the third extension tail, and each first extension portion defines an opening at a position where the core and the tail portion are soldered.

10. The electrical connector according to claim 9, wherein the metal shielding plate comprises a second extended portion connecting the fourth extension tail, and the second extended portion is disposed opposite to the first extended portion.

11. An electrical connector assembly, comprising:
  a first electrical connector, comprising:
  a first housing; and
  a plurality of first mating modules assembled to the first housing;
  each first mating module comprising:
  a plurality of first conductive terminals extending along a mating direction, each first conductive terminal comprising a first tail portion and a first mating portion;
  a first metal shield;
  a second metal shield, the first metal shield and the second metal shield being located on opposite sides of the first conductive terminals; and
  a first cable, the first cable comprising a plurality of first cores electrically connected to the first tail portions;
  wherein the first conductive terminals comprise first differential signal terminals, a first ground terminal and a second ground terminal, wherein the first differential signal terminals are located between the first ground terminal and the second ground terminal; and
  wherein the first metal shield, the second metal shield, the first ground terminal and the second ground terminal jointly form a shielding space enclosing the first mating portions of the first differential signal terminals; and
  a second electrical connector for mating with the first electrical connector, the second electrical connector comprising:
  a second housing; and
  a plurality of second mating modules assembled to the second housing;
  each second mating module comprising:
  a plurality of second conductive terminals extending along the mating direction, each second conductive terminal including a second tail portion and a second mating portion;
  a metal shield surrounding member comprising a plurality of hollow portions surrounding the mating portions; and
  a second cable comprising a plurality of second cores electrically connected to the second tail portions.

12. The electrical connector according to claim 1, wherein the housing comprises a pair of second extension walls extending from another side of the body portion, and a mounting space formed by the pair of second extension walls and the body portion; each second extension wall defines a plurality of mounting slots communicating with the receiving space; and the plurality of mounting slots are configured to position the plurality of mating modules.

13. The electrical connector assembly according to claim 11, wherein the first housing comprises a body portion, a pair of first extension walls extending from one side of the body portion, and a receiving space formed by the body portion and the pair of first extension walls; the body portion defines a plurality of terminal receiving grooves extending through the body portion and communicating with the receiving space; and wherein the metal shield surrounding member is inserted through a corresponding terminal receiving groove to reside in the receiving space in a cantilevered manner.

\* \* \* \* \*